INVENTOR.
MORRIS L. HUTCHENS
BY
ATTORNEY

May 10, 1966 M. L. HUTCHENS 3,249,997
PROGRAM TOOL VERIFIER
Filed Sept. 3, 1963 10 Sheets-Sheet 2

INVENTOR.
MORRIS L. HUTCHENS
BY Cyril M. Hajewski
ATTORNEY

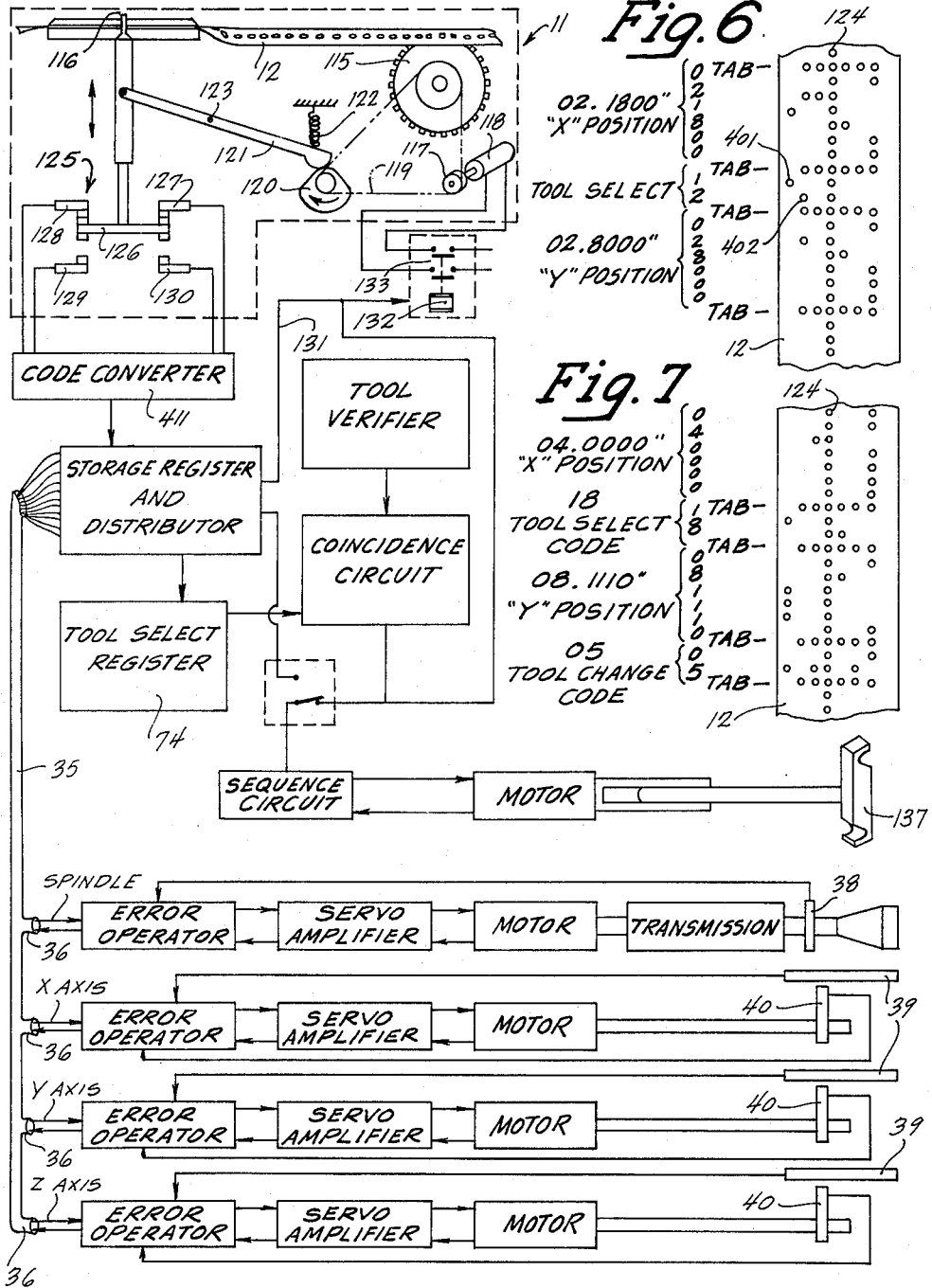

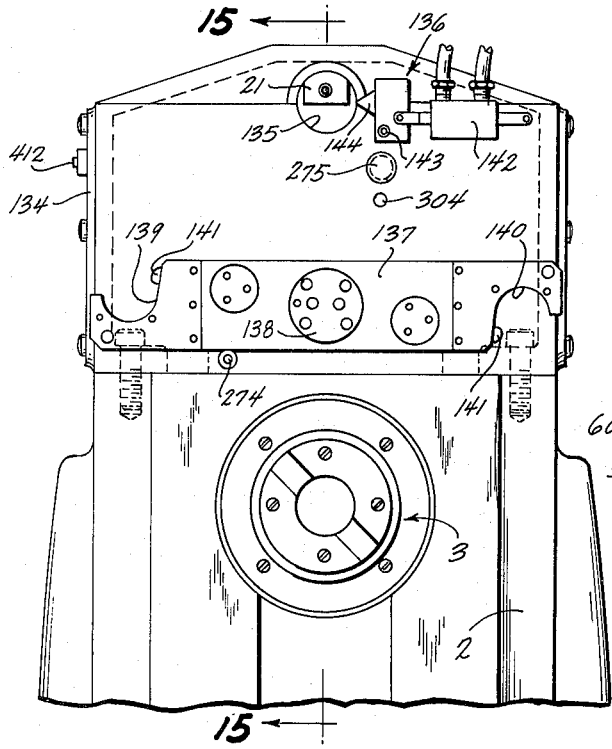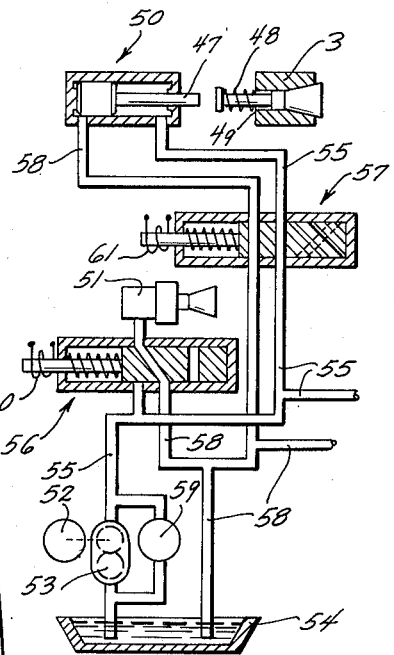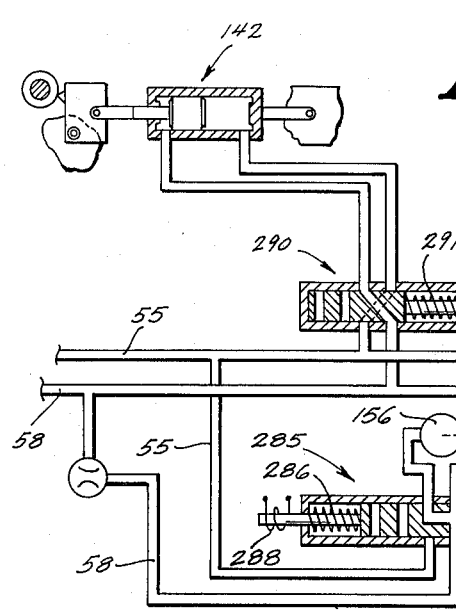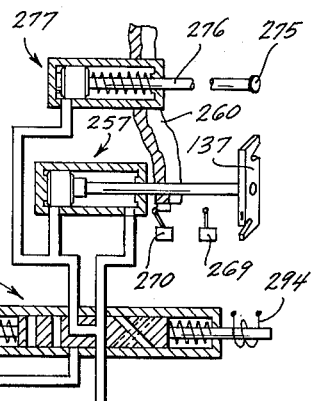

INVENTOR.
MORRIS L. HUTCHENS
BY
Cyril M. Hajewski
ATTORNEY

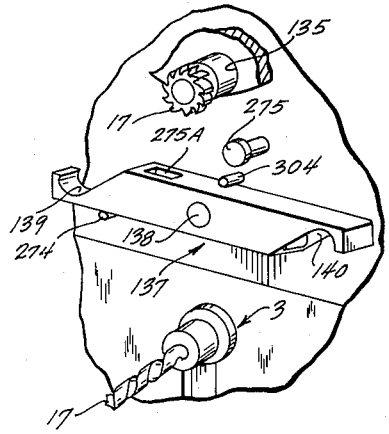
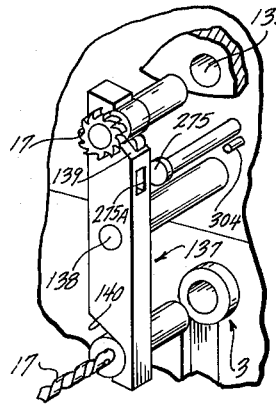
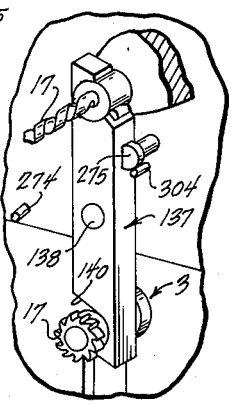
*Fig.11*  *Fig.12*  *Fig.13*
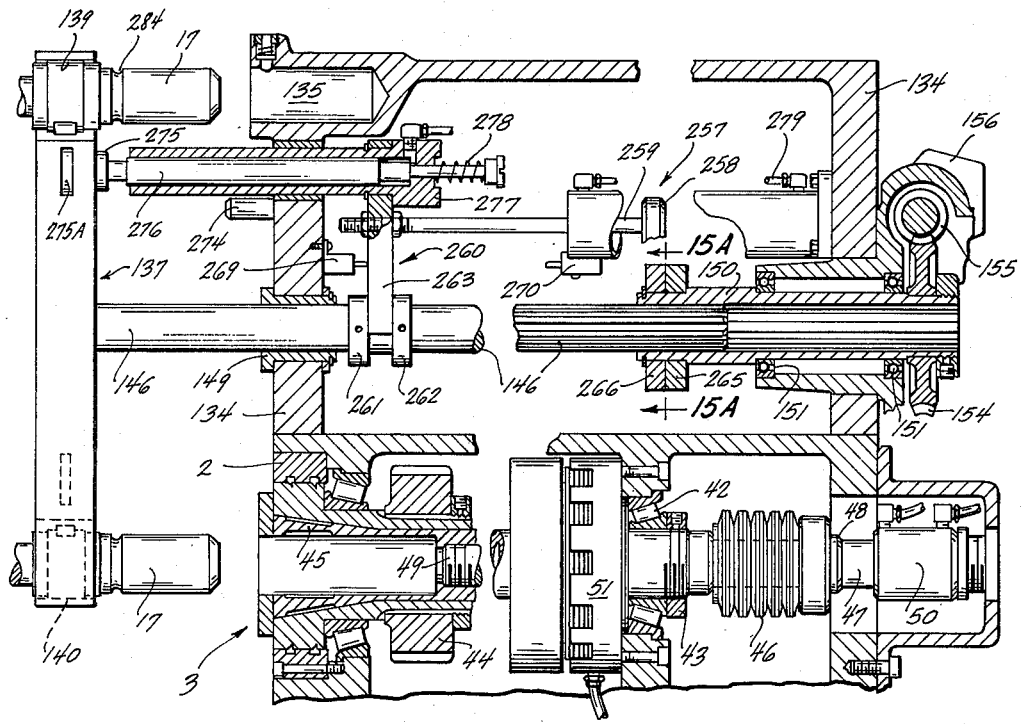
*Fig.15*
INVENTOR.
MORRIS L. HUTCHENS
BY
ATTORNEY

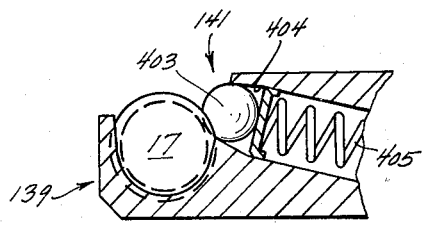
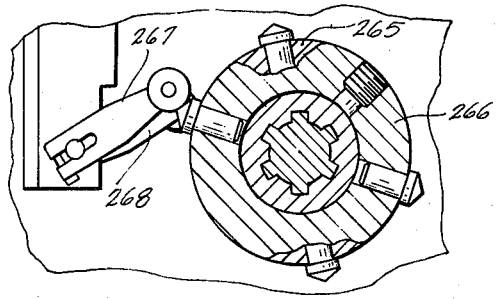
Fig. 14    Fig. 15 A
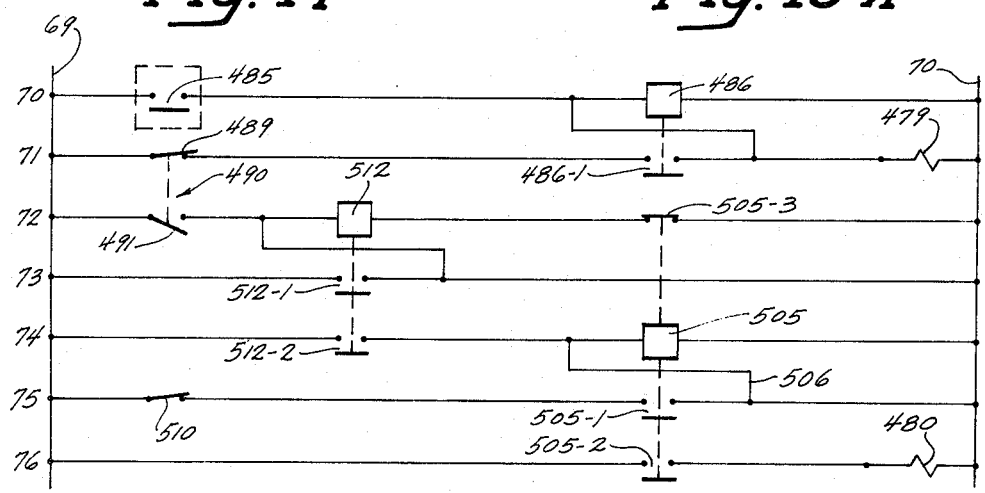
Fig. 23
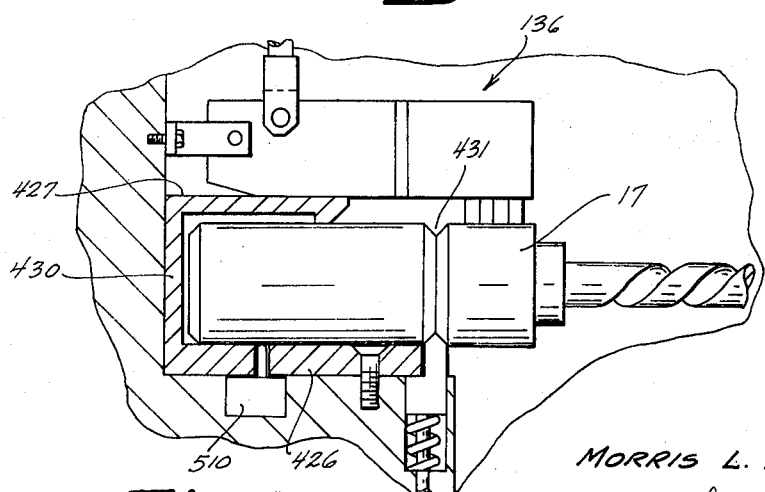
Fig. 22

May 10, 1966  M. L. HUTCHENS  3,249,997
PROGRAM TOOL VERIFIER
Filed Sept. 3, 1963  10 Sheets-Sheet 9

INVENTOR
MORRIS L. HUTCHENS
BY
Cyril M. Hajewski
ATTORNEY

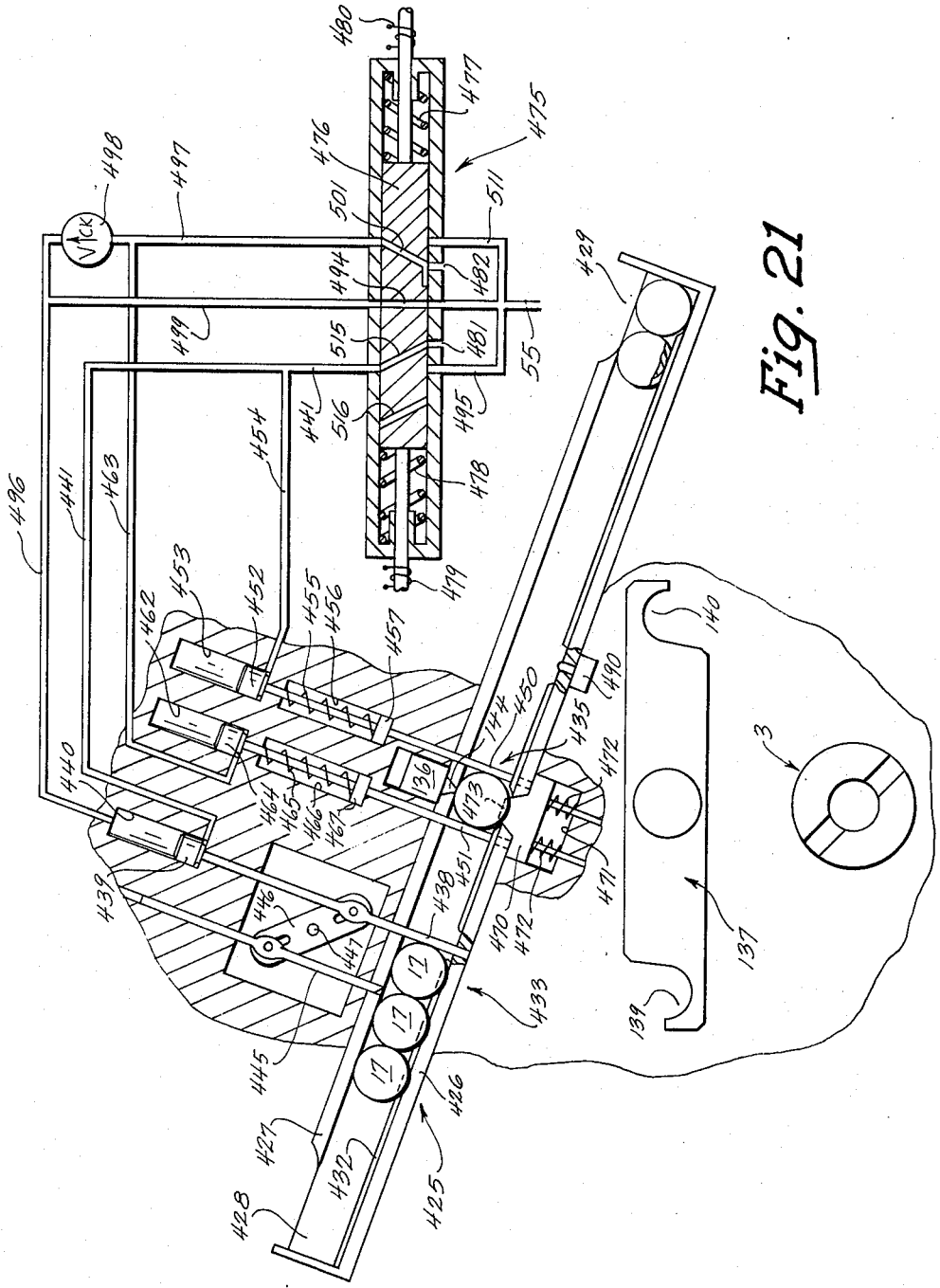

United States Patent Office 3,249,997
Patented May 10, 1966

3,249,997
PROGRAM TOOL VERIFIER
Morris L. Hutchens, Brookfield, Wis., assignor to Kearney & Trecker Corporation, West Allis, Wis., a corporation of Wisconsin
Filed Sept. 3, 1963, Ser. No. 305,945
8 Claims. (Cl. 29—568)

This invention relates generally to automatically operated machine tools and more particularly to an improved machine tool incorporating an apparatus for verifying the operator's selection of a tool to be placed in the operating station of the machine and interrupting the operation of the machine whenever an improper tool selection has been made.

The detailed illustrative specific embodiment of the invention, utilizes a tape controlled machine tool wherein the tape controls the various slides and spindle movements of the machine tool creating the desired machining operations with a particular tool being employed for a specific cycle of machining operations. Each tool is manually placed in a designated location in the machine tool by the machine operator and he presses a start button whereupon the tape is read and controls the movements of the machine for carrying out the operations set up for that particular tool. After the operations to be performed by the selected tool are completed and the tape has transmitted a binary code for the next tool to be used, the tape stops the operation of the machine tool. At this point, the previously used tool is removed from the operating station and a newly specified tool is inserted. Operation of the machine is then initiated for completion of its succeeding cycle of operations with the new tool. It is important that the tools placed in the operating station be the tools specified by the tape to avoid damage to the machine and the workpiece.

It is therefore a general object of this invention to provide an improved machine tool incorporating apparatus that automatically checks the machine operator in his selection of tools for performing machining cycles by providing means to preclude the starting of the machine until his selection has been verified as the proper tool for the next operation of the machine tool.

It is another object of this invention to insure that the placement of tools in a programmed machine tool by a machine operator is in accordance with the tools specified for the program.

Another object of this invention is to provide a tool verifier to identify a tool selected by a machine operator and to compare the tool identity with the next tool specified by the command of a programmed machine tool so that if coincidence exists, the tool may be placed in the machine.

Another object is to provide a program source controlling machining operations successively using a series of tools, providing in the program source a code designation of each tool to be used, providing a code reading means for reading the code of the next tool to be placed in the machine by the machine operator, providing a coincidence mechanism receiving the code designation from the program source and the code designation from the code reading means and conditioning the machine for operation whenever coincidence exists between the code designations.

Another object of this invention is to provide a programmed machine tool with an interlock control having a coincidence circuit connected for receiving tool signals called for by the program and tool identity signals of manually selected tools and operative to complete an electrical coincidence circuit when the program tool signal and the tool identity signal are identical with each other.

Another object of this invention is to provide a machine tool with an electrical control circuit for comparing a manually selected tool carried in a tool change station with a programmed tool select signal for controlling a tool change operation.

Another object of this invention is to provide a programmed machine tool with means for verifying a manually selected tool with a tool called for by the program incident to the further operation of the machine tool.

The foregoing and other objects of this invention will become more fully apparent from the following detailed description thereof, augmented by exemplifying apparatus illustrated in the accompanying drawings, in which:

FIG. 5 is a diagrammatic view mostly in block form illustrating the control system for the selection and verification of tools and for regulating the movable members of the machine tool;

FIG. 6 is a plan view of a section of punched tape illustrating the spatial arrangement of holes in a tape provided with a tool select signal and which also initiates a tool change cycle;

FIG. 7 is a plan view of a section of punched tape illustrating the spatial arrangement of holes in a tape provided with a tool select signal at one point on the tape and a tool change signal at another point;

FIG. 8 is a digrammatic view of the hydraulic circuit for the machine tool of FIG. 1;

FIG. 10 is a fragmentary view in front elevation of a modification of the machine tool in FIG. 1 incorporating a tool change member for exchanging tools between the spindle and a storage cradle;

FIG. 11 is a view disclosing the tool change member in idle position;

FIG. 12 is a view showing the tool change arm rotated in a clockwise direction from its position in FIG. 11 to grip the tools and extended outwardly to withdraw the tools;

FIG. 13 is a view showing the change arm rotated 180° from the position shown in FIG. 12 for interchanging the positions of the tools to align the used cutter with the cradle and the new drill with the spindle;

FIG. 14 shows a detail view in vertical section illustrating the tool grip that holds the tool in the socket of the change arm;

FIG. 15 is a fragmentary view in vertical section taken along the plane represented by the line 9—9 in FIG. 10 through the center of the machine tool;

FIG. 15A is an enlarged detail view of the cams and their cooperating switches which are shown in the assembly depicted in FIG. 15;

FIG. 16 is a diagrammatic view of a hydraulic circuit to be combined with the hydraulic circuit in FIG. 6 for operating the tool change member shown in the machine tool depicted in FIG. 10;

FIG. 21 is a fragmentary view, partly in front elevation and partly in section, showing an apparatus for individually feeding a plurality of tools to the tool change station of the machine tool of FIG. 8;

FIG. 22 is a transverse view, partly in section, showing the relationship of the tool verifier to the tool guide track illustrated in FIG. 16; and, FIG. 23 is a diagrammatic view of electrical circuitry to be added to the electrical control circuit of FIG. 17 to accommodate the apparatus illustrated in FIG. 21.

Figure 1:
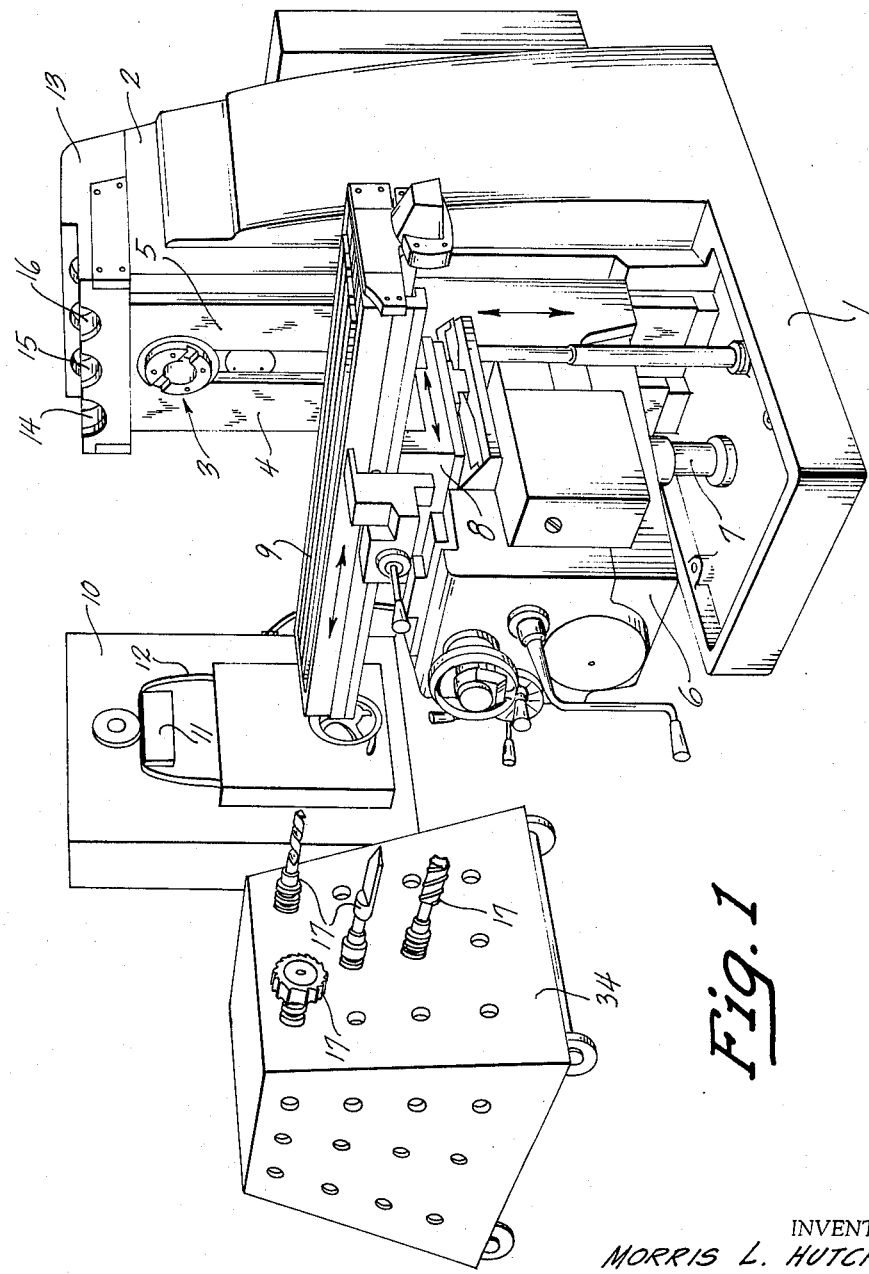
FIGURE 1 is a perspective view of a machine tool incorporating the features of the present invention and including a storage rack for storing tools, as well as a tape control unit for regulating the operation of the machine tool.

This invention is particularly applicable to multi-purpose machine tools which perform a plurality of operations on a workpiece in a series of cycles, the tool being changed for each cycle. One example of this type of machine is disclosed in a United States patent to Brainard et al., 3,052,011, issued on September 4, 1962. The Brainard machine is tape controlled, and when one tool completes its machining operation, the tape calls for the next tool for the next cycle. The tools are stored in random arrangement in a magazine and through coded information, the next tool is selected and mechanically placed in the spindle.

In contradistinction thereto, the present invention provides for the machine operator to arrange the tools in the sequence in which they are to be used, or called for by the tape, and the tools are manually placed in the machine in the required sequence. In this operation, when the cycle ends, or the operation using one tool is finished, the machine is stopped, the machine operator manually removes the tool from the spindle, places the next tool in the spindle and starts the machine to continue with the next cycle. It is apparent that if the operator places an incorrect tool in the spindle, the workpiece can be ruined, or due to spindle speeds and member movements being incompatible with the tool in the spindle, the machine may be stalled or damaged. It is therefore important that the operator places the correct tool in the spindle, or more especially, that the machine tool is precluded from starting unless the correct tool is in the spindle. To this end, the invention provides an interlock between the tool called for by the tape or other program means, and the tool placed in the spindle, that precludes the starting of the machine operation unless the tool placed in the spindle is the tool called for by the tape or other program means as will hereinafter appear. Throughout this specification, reference is made to the spindle of the machine tool but the use of the word "spindle" is for simplicity of expression and is not intended to restrict against other toolholders and operators. The invention is applicable to machine tools generally irrespective of their types, the tools used and the manner in which the tools are operated. It is also noted that the words "machine operator" refer to the man in charge of operating the machine and not to any mechanical mechanism.

It is noted that in the aforesaid Brainard patent, the magazine of tools is rotated until a code on the tools coincides with the code of the tool called for by the tape, whereupon the magazine stops and reverses at creep speed, and the checking circuits are disconnected and reapplied to check the tool as it moves into tool change position. However, if coincidence does not exist at creep speed, the magazine will not stop, but will continue rotating to try and find the tool called for. In contradistinction to this operation, the present invention does not provide for tool selection, but rather for the verification of a tool already selected. Furthermore, the Brainard structure could not be used in accordance with the present invention as is apparent.

Although the invention may be applied to different types of machine tools as already stated, the machine tool of FIG. 1 is illustrative and includes a base 1 having a vertical column 2 supporting a spindle 3 and vertical guideways 4 and 5 supporting a knee 6 for vertical sliding movement under control of a screw 7 that engages a cooperating nut [not shown]. A saddle 8 is supported on the knee 6 for horizontal movement to and from the column 2 and a worktable 9 is supported on the saddle 8 for horizontal movement at right angles to the saddle movement or across the front face of the column 2. The movements of the knee, saddle and worktable are carried out by conventional mechanisms [not shown], and this provides movement of the worktable 9 along X, Y and Z axes. It is to be understood, however, that the movement along the X, Y and Z axes can be accomplished in other conventional ways as by moving the tool along such axes as in Brainard, above referred to, or by dividing the X, Y and Z movements between the tool and worktable. It is also contemplated, but not shown, that the tool spindle 3 may be conventionally mounted for sliding movements. These details are common in the prior art and not particularly significant to the instant invention. The machine tool is provided with and controlled by a tape unit 10 which includes a tape reader 11 for reading a tape 12.

Figure 3:
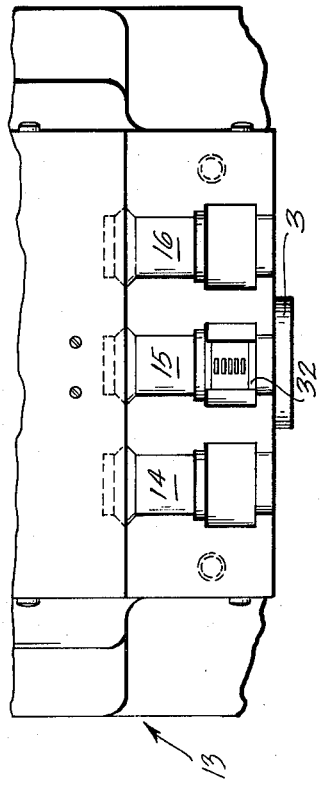
FIG. 3 is a partial plan view of the top of the machine tool depicted in FIG. 1 showing the tool cradles.
Figure 2:
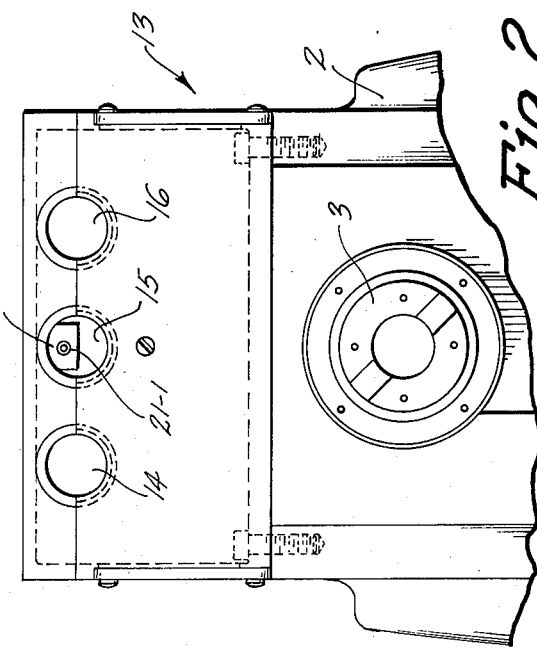
FIG. 2 is an enlarged fragmentary view in front elevation of the upper portion of the machine tool of FIG. 1.
Figure 4:
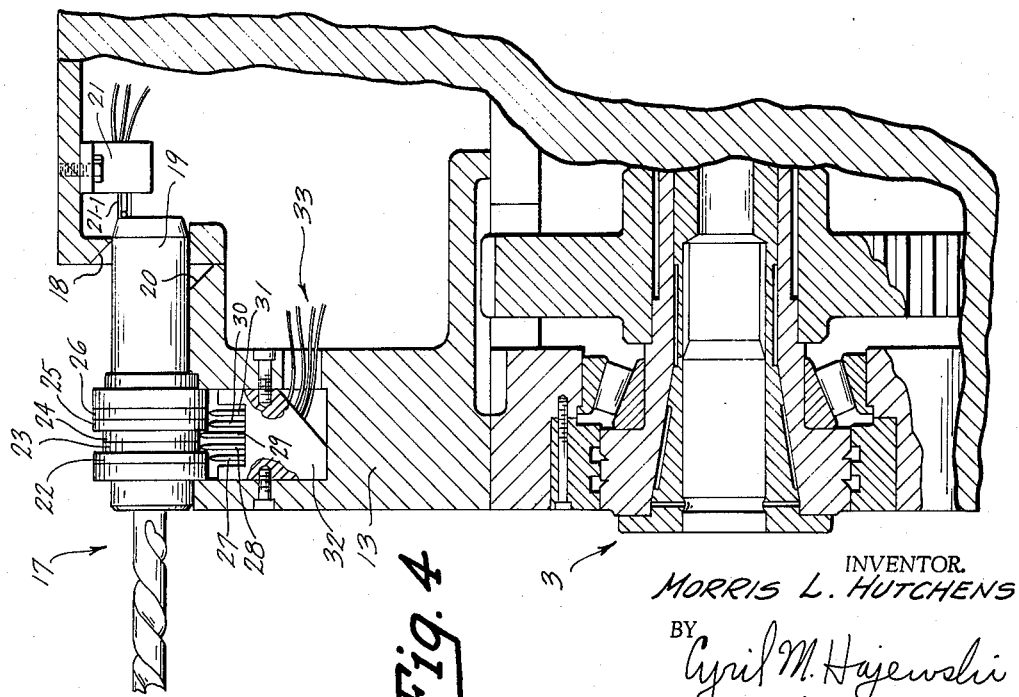
FIG. 4 is a fragmentary side view partly in vertical section and partly in side elevation depicting the spindle and the tool cradle of the machine tool illustrated in FIG. 1.

To the above described illustrative machine is added a cradle cap 13 at the top of the column 2, which provides three cradles 14, 15 and 16. As more fully illustrated in FIGS. 2, 3 and 4, the top of the cradle cap is in two levels and each of the cradles, in effect, comprise a semi-circular recess opening into the first level and joining a circular bore in the second level, the semi-circular recess and the bore approximating the outline of the tool 17, as illustrated in FIG. 4. The bore has its entrance tapered as at 18, FIG. 4, to facilitate insertion of a tool shank 19, which shank, after insertion, keeps the tool from tilting out of the cradle. Further, to facilitate placement of the tools in the cradle, each cradle is provided with circular recesses 20. One of the cradles, here shown as the middle cradle 15, FIG. 3, is provided with a tool verifier 32 and a switch 21 which has a spring pressed plunger 21–1, urged inwardly by the tool to actuate the switch 21 to signal that a tool has been placed in this cradle. The other two cradles are for the convenience of the machine operator in holding used tools and can be omitted if desired. The cap 13 may be constructed as a self-contained unit bolted to the top of the column 2, as illustrated in FIG. 2.

The tool 17, illustrated in FIG. 4, is a drill and drillholder combination, but the same could be an integral structure and the tool could be a different type. The combination and integral structure are of the type illustrated in the United States patent to Sedgwick, 3,052,999, issued September 11, 1962, wherein the tool or tool combination is provided with a series of code rings that are identified in the present application by the reference numerals 22, 23, 24, 25 and 26, with the code rings being of two different diameters so arranged with each tool to set up the code that identifies the tool. Each code ring cooperates with its respective plunger, of a set of plungers 27, 28, 29, 30 and 31, which constitute part of the code reader or tool vertifier 32 seated in a cavity at the bottom of the semi-circular recess 15 and secured by bolts, as shown in FIG. 4. The plungers operate switch systems and are normally urged to their outward position by a spring [not shown] when cooperating with a small diametered code ring, as 28, 29 in FIG. 4, or are pressed inwardly against the outward urge by the larger diametered code rings, such as plungers 27, 30 and 31. The inward and outward positions of the plungers produce actuation of switches in different combinations, as will be presently described, to create a signal which is transmitted to the electrical system via the conductors 33. The plungers are related to the bottom of the cradle, as noted in FIG. 3.

In carrying out this invention, a multi-toolholder or storage rack 34, FIG. 1, is provided adjacent to the machine tool for storing the tools 17, illustratively placed in FIG. 1. However, in actual practice of the invention, the machine operator places the tools 17 in the rack 34 in the sequence of use by the machine so that one tool after another can be selected as the machining operation proceeds. The first tool 17, or the next tool to be used, is manually pulled out of the rack 34 and placed in the cradle 15 wherein the plungers 27 to 31 are actuated by the code rings 22 to 26 in the particular combination to identify the tool in the cradle. At the start of a machining operation, or after a cycle with a previous tool has been completed and the spindle has stopped, the machine operator will first remove the previous tool, if any, from the spindle and place it in one of the cradles 14 and 16, or directly into the storage rack 34. He will then place the tool from cradle 15 into the spindle 3 and actuate the machine start button to proceed with the next cycle of operations. If the code commanded by the program is the same as that of the tool as determined by the verifier, the machine will proceed with the next cycle, but if coincidence does not exist, actuation of the start button will not start the machine, as hereinafter explained.

Reference at this time is briefly made to the schematic disclosure of FIG. 5, wherein tape signals from the tape reader 11, reading the tape 12, are transmitted to a code converter and from there to a storage register and distributor. From there the signals proceed through a multi-wire cable 35, to branch lines 36 to the controls for the spindle and the X, Y and Z axes movements. The operative controls for these elements are shown in the prior art and may include a servo amplifier to operate the motor of each element and the feedback control for each element, including a tachometer 38 for the spindle 3, and a scale 39 and slider 40 for each of the axis of movements which feed signals, as to the actual operation of the elements, back to the error operator and are there compared with the tape command to further actuate the movements to correct any error with respect to the tape command. The storage register and distributor also sends tool code signals to the tool select register which stores each tool code signal and also conditions the coincidence circuit in accordance with the code. The coincidence circuit compares the code coming from the tool select register with that coming from the tool verifier to control the aforementioned interlock. The schematic disclosure illustrates the general operation of a tape controlled or program machine including the tool select register, the tool verifier and the coincidence circuit which have been added thereto by this invention. Before going into the details of the latter elements, the spindle and its actuation will be explained.

The spindle 3, as illustrated in FIG. 15, is rotatably supported in the column 2, by bearings 41 and 42 held against axial movement by a nut 43 and driven by a variable speed transmission (not shown) through either a slow speed gear 44, or a high speed gear (not shown). Mounted within the spindle 3 is a collet 45 having conical surfaces coacting with the complementary faces of the spindle and actuated under the pressure of a spring 46 to grip the tool 17. Release of the collet 45 is effected by a pin 47, which is driven by a fluid motor 50 to engage an end 48 of a collet actuator 49 for compressing the spring 46 and urging the collet forwardly to its tool releasing position. The spindle is further provided with a hydraulically operated brake 51 to stop rotation of the spindle when desired.

FIG. 8 discloses the hydraulic circuit for operating the spindle wherein an electric motor 52 drives a pump 53 for withdrawing fluid from the sump 54 and discharging it into a pressure line 55 for transmission to a pair of solenoid valves 56 and 57, the fluid returning to the sump via an exhaust line 58. A pressure relief valve 59 is connected in parallel with the pump 53 to function as a safety device against excess pressure in the pressure line 55. The plungers in the solenoid valves 56 and 57 are spring urged in one direction and operated in the other direction against the spring pressure by solenoids 60 and 61 respectively. Valve 56 is connected in the pressure and exhaust lines to control the brake 51 of the spindle 3 as is apparent. In a similar manner, the valve 57 is connected to control the collet release motor 50.

In order to facilitate the location of the electrical elements in the circuit, the elements are connected in horizontal lines that are connected across a pair of vertically disposed supply lines 69 and 70 and the horizontal lines are numbered consecutively beginning with number 1 at the top down to the last line which is numbered 47. The reference numerals identifying the various electrical elements are followed by a number in parentheses which identifies the number of the line in which that element is located. Thus, relay 75(8) indicates that the relay 75 is located in horizontal line 8 of the electrical circuit.

Figure 9:
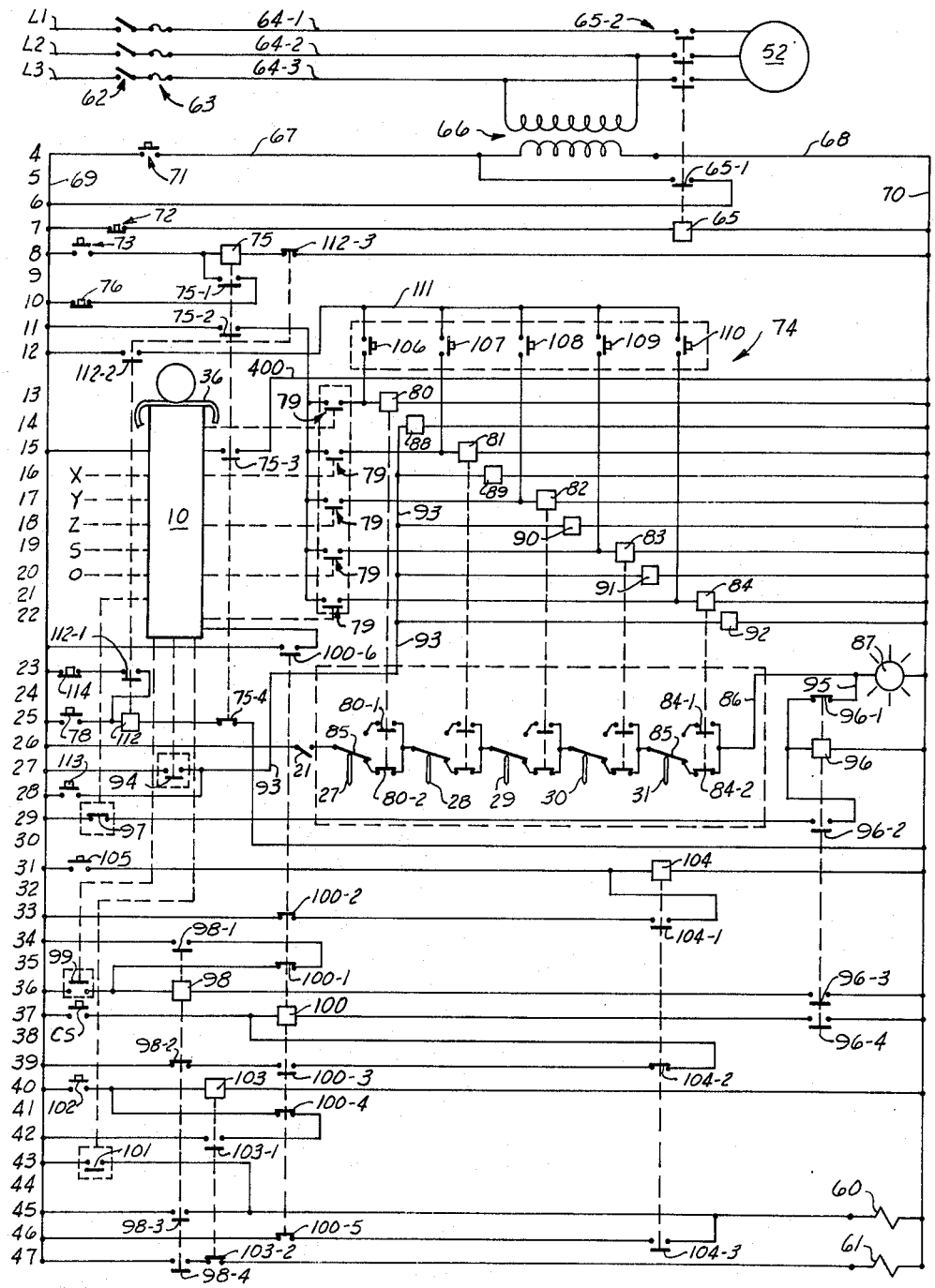
FIG. 9 is an electrical wiring diagram showing the control circuit incorporated in the machine tool of FIG. 1 for selecting a desired tool and effecting a tool change operation.

The electrical system for controlling the machine tool of FIG. 1 is illustrated in FIG. 9. Three phase power is supplied to the circuit through conductors L1, L2 and L3, the usual main switch 62 and fuses 63 to the conductors 64–1, 64–2 and 64–3, and thence through the motor contacts 65–2 for energizing the fluid pump motor 52. A transformer 66 is connected between the conductors 64–2 and 64–3 to supply a control voltage to the electrical system via conductors 67 and 68 which are connected to the main power supply lines 69 and 70 that extend vertically along each side of the diagram to provide "across-the-line" connection for the elements of the system. The power supply lines 69 and 70 are energized by actuating a push button switch 71. Closure of the switch 71 also energizes a circuit that crosses from line 69 through a master stop switch 72 and a relay 65 to the power line 70. Activation of relay 65 by this circuit not only closes the contacts 65–2 to energize the fluid supply motor 52, but also closes contact 65–1 which creates a holding circuit by-passing the push button switch 71 for retaining the power lines 69 and 70 energized until the circuit is interrupted by actuating a stop switch 72.

To supply current to the tool select register 74 and the tape control unit 10, the pushbutton 73(8) is depressed to activate a relay 75 which closes its contacts 75–1, 75–2 and 75–3 and opens its contact 75–4. Closure of contact 75–1(9) creates a holding circuit by-passing push button 73(8) and including a stop switch 76. Closure of contact 75–2(11) connects power line 69 through the conductor of line 11 to a vertical conductor that feeds current to the tool select register 74. Closure of contact 75–3(15) feeds current from the power line 69 through the conductor of line 15 to the tape control unit 10 and the circuit is completed through a conductor 400 to the power line 70. Opening of the contact 75–4(25) prevents the manual control push button 78 from energizing its circuit during automatic operation of the machine tool. The manual circuit will be described hereinafter.

Extending to the right of the tape control unit are five dotted lines indicating circuits controlled by the tape for actuating any five switches 79, either individually or in combination, and which control five cooperating relays 80, 81, 82, 83 or 84 respectively, each relay representing one digit of a digital system forming the tool code information. Each one of the circuits run from the power line 69 through the tape control unit, through one of the switches 79 and a cooperating relay 80–84 and thence to the power line 70. Each relay coil has a dotted line extending down to the contacts they control, and since they are all identical, only one will be explained. Thus, relay 80 actuates contacts 80–1 and 80–2, contact 80–2 being normally closed and indicating a zero digit. If the tape actuates switch 79 and the relay 80, contact 80–2 will be opened and contact 80–1 will be closed indicating a digit number. In like fashion, actuating any of the other relays 81, 82, 83 and 84 will designate digit numbers and the combination of such actuations will give the code number of the specified tool. Inasmuch as the relays are latching relays, the code number of the tool called for is stored in the tool select register and the tape unit can proceed past the tool selection and, for example, give bits of information to the machine apparatus, such as the X, Y and Z axes movements, or the spindle operation, or other controls, as indicated at the left of the tape control unit 10.

The plungers 27, 28, 29, 30 and 31 of the tool verifier 32 are represented diagrammatically in lines 26 to 28 of the diagram and each can activate a double throw switch 85 when they are actuated by one of the large code rings on the tool. This section of the electrical diagram constitutes a coincidence circuit receiving signals for the tool called for by the tape 12 and signals from the tool placed in the cradle 15 to determine whether coincidence exists or does not exist in the circuit and therefore, whether the two tool codes are the same. For instance, the activation of relay 80 indicates the binary number of the tool called for, then contact 80–2 will be opened and contact 80–1 will be closed. Current will flow from the power line 69 through the aforesaid switch 21(26), indicating the presence of a tool in the cradle, over to the double throw switch 85, and if the code rings of the tool in the cradle activate plunger 27, only it actuates switch 85 to its upper contact so that current will continue across the now closed contact 80–1, closed by energization of relay 80, thence down the next double throw switch across the next normally closed contact of the inactive relay 81, and so on to the conductor 86 and through a light 87 to the supply line 70. The light 87 will light and thereby indicate that coincidence exists in the circuit and that the tool placed in the cradle is the tool called for by the tape. The tool is therefore verified for placement in the spindle. However, if a wrong tool had been placed in the circuit represented by the actuation of plunger 31, for instance, double throw switch 85 would not be actuated to bridge its upper terminal and the current would be blocked by the open contact 80–2, which was opened by the tape command through energization of relay 80. There would be a further gap in the circuit since the double throw switch 85 activated by plunger 31 would be actuated out of engagement with its lower terminal which is connected to the closed contact 84–2 of relay 84 and the switch contact would bridge its upper terminal which is connected to the open contact 84–1 of relay 84. The light 87 would not go on and the machine would not be conditioned for a machining operation. The machine operator would have to remove the wrong tool and put in the right one before the machine would start. The coincidence circuit is substantially a series circuit connected to power line 69 by the switch 21 which indicates that a tool has been placed in the cradle. The series circuit is either completed for the conduction of current or opened and non-conductive depending on the presence or absence of coincidence. When any of the tape command relays 80 to 84 or the verifier plungers 27 to 31 are actuated, such actuation opens the series circuit and prevents the conduction of current unless a relay actuation is accompanied by a corresponding plunger actuation for the same digit, since one actuation will open the circuit and the other actuation will close the circuit thereby indicating coincidence.

As another specific example, the tape acts to energize relays 80, 83 and 84 which relays will then open their lower contacts and close their upper contacts and this information, due to the latching of these relays, will be stored in the register while the tape may proceed reading other information. The latching of relays 80, 83 and 84 notes that a tool having the binary number 10011 or the decimal number 19 is called for. The binary number 10011 gives the decimal reading 16.0.0.2.1, which adds to 19. If a tool is not already in the cradle 15, the machine operator will take the next tool from the rack 34 and place it in the cradle 15 and this tool is shown so placed in FIG. 4. The rings on the tool, shown in the cradle 15 in FIG. 4, denote the binary number 10011, in that the rings 22, 25 and 26 actuate the plungers 27, 30 and 31 to indicate that the first, fourth and fifth digits of the binary number are "on," and the rings 23 and 24 allow the plungers 28 and 29 to be extended to represent 0, indicating that the second and third digits of the binary number are "off." Accordingly, the decimal number 19 is indicated so that tool number 19 is in the cradle. Therefore, the plungers 27, 30 and 31 will throw their corresponding double throw switches 85 so that they bridge their upper terminals corresponding with the contact actuation of relays 80, 83 and 84 so that coincidence is established in the circuit and the proper tool is ready to be inserted in the spindle upon the completion of the current cycle.

After the tool code information stored in the register has been used, the relays 80 and 84 have to be unlatched so that circuit provides unlatching relays 88 to 92, one for each of the latching relays respectively, and each of the unlatching relays are connected to a common conductor 93 that is controlled by a tape controlled switch 94(27) as will later be described.

As stated above, when coincidence is established in the coincidence circuit, indicating that the proper tool has been placed in the cradle 15, the light 87 lights up. At the same time, current from conductor 86 flows into a conductor 95 through a normally closed contact 96–1(24) and through a relay 96 and from there to the supply line 70. Energization of relay 96 causes it to open its normally closed contact 96–1 and close its normally open contacts 96–2, 96–3 and 96–4. Normally closed contact 96–1 is opened to disconnect the coincidence circuit so that it will be free to store the next tool selection, but first a holding circuit is established for maintaining relay 96 energized through now closed contact 96–2(29), which holding circuit can be deactivated by the tape controlled switch 97(29) which is connected in the holding circuit. Closure of contact 96–3(36) completes a circuit from supply conductor 70 for energizing relay 98(36) which is the tool change relay, as will be later explained. It should be noted that relay 96 is energized because the coding on the tool in the cradle 15 corresponds to the tool designated by the tape in the tool select register as the tool required for the succeeding machining operation. Such correspondence was determined by the operation of the tool verifier 32 in conjunction with the coincidence circuit in lines 25, 26 and 27 of the electrical diagram of FIG. 9. If correspondence does not exist, relay 96 will not be energized and the machine will not operate. It checks the machine operator in his selection of tools and prevents the machining operation in the event the operator has selected a wrong tool, i.e., one that is not called for by the tape.

In the event that the right tool has been selected and this has been verified by the tool verifier cooperating with the coincidence circuit, the relay 96 is energized and through its contact 96–3, a circuit is completed to energize relay 98(36). Connection of relay 98 to power line 69 passes through normally open tape controlled switch 99 which, when closed, denotes the end of a cycle of machining operations and indicates that a tool change operation is in order. Thus, at this point, the energization of relay 96 notes the verification of the tool and conditions the electrical system for proceeding with a tool change when called for by the tape by its closure of the switch 99 to energize relay 98 which then closes its contacts 98–1, 98–3 and 98–4 and opens contact 98–2. Closure of contact 98–1(34) establishes a holding circuit through normally closed contact 100–1, to be later described. Closure of contact 98–3(45) closes a circuit to the spindle brake solenoid 60(45) across the power lines to energize the same and stop the spindle if it has not already been stopped by closure of the tape controlled switch 101(43). The solenoid 60 shifts the control valve 56 in FIG. 8 to apply the brake 51. In any event, switch 98–3 insures that the spindle will be stopped and braked prior to a tool change operation. Contact 98–4(47) connects the collet release solenoid 61(47) to the power lines 69 and 70 which shifts valve 57, FIG. 8, to admit fluid to the motor 50 to relase the collet 45 and enable the used tool, if any, to be removed and a new tool to be inserted into the spindle and secured by the collet. Contact 98–2(39) is in a holding circuit to be later described.

So far, the tool in cradle 15 has been verified by the coincidence circuit checking the tool select register and the tool verifying register and thereby energizing relay 96 to condition a circuit for a tool change, and the tape control unit has actuated switch 99 to energize relay 98 for applying and maintaining the spindle braked and to open the spindle collet. Conditions are now set for a tool change which is carried out manually by the machine operator. First, the operator removes the tool from the collet, unless this is the start of a machining operation on a new workpiece in which event, a tool will not be in the collet. Then, the operator will pick up the verified tool from the cradle 15 and place it in the collet. The machine tool is now ready to start a new cycle of operation. It should be noted that the tape controlled switch 99 can be actuated, whether or not a verified tool is in cradle 15, but the circuit controlled by switch 99 will not be energized until a tool is placed in cradle 15 and verified to actuate relay 96 and complete the tape controlled circuit by closing the contact 96–3.

The verified tool now having been placed in the collet, the machine operator actuates a manually operated switch 102(40), which energizes relay 103(40) to actuate contacts 103–1 and 103–2. Contact 103–1 is closed to complete a holding circuit for maintaining relay 103 energized through normally closed contact 100–4(41). Contact 103–2(47) deenergizes the circuit through the collet release solenoid 61 and the valve spring returns the valve 57, FIG. 8, to conduct fluid to motor 50 to withdraw the piston pin 47 and allow the collet to grip the tool under the pressure of spring 46.

The tool change with the new tool gripped in the collet is now completed and the operator is ready to initiate the cycle of operations for the new tool. To accomplish this, the operator actuates the tool change complete switch CS(37) which energizes relay 100, since contact 96–4 is still closed, and the energized relay 100 closes its contacts 100–3 and 100–6 and opens its contacts 100–1, 100–2, 100–4 and 100–5. Opening of contact 100–1 interrupts the holding circuit to deenergize relay 98 and thereby opens contact 98–3(45) to the brake circuit to release the spindle for rotation and interrupts the collet release circuit by opening contact 98–4(47) if it has not already been interrupted by relay contact 103–2. Contact 98–2 is moved to its normally closed position so that a holding circuit is established for relay 100 by closing of contact 100–3(39). Contact 100–5(46) is in a parallel spindle brake circuit and will be later described. Opening of contact 100–4(41) breaks the holding circuit for relay 103 as this relay is no longer needed since the collet release circuit is already disconnected by opening of contact 98–4(47). Opening of contact 100–2 interrupts the holding circuit of relay 104(31). Closing of contact 100–6 (between lines 22 and 23) completes a circuit to the tape control unit 10 which indicates that the tool change has been completed and starts the tape control to initiate the next cycle of machining operations. Therefore, energizing of the relay 100 in immediate effect, insures that the collet has gripped the tool and that the spindle is free to rotate and starts the machine tool on its next cycle of machining operations.

Upon restarting the tape control, the tape operates to close the switch 94(27) which energizes the common conductor 93 and therefore each of the unlatching relays 88(14), 89(16), 90(18), 91(20) and 92(22) to unlatch each of the tool select relays 80 to 84, and since contact 96–1(24) has been opened, the tool select register is now available for the next tool selection when called for by the tape. Such selection can be embodied in the tape for designating a tool selection at any time during or after a machining operation. The unlatching circuit runs from supply line 69, through the tape controlled switch 94, along the conductor 93, which has branch conductors to each unlatching relay, and from each relay to the supply line 70. Unlatching of the relays serves to actuate their respective contacts to their normal position.

Upon completion of the machining cycle with the new tool, the tape control unit 10 actuates its associated switch 101(43) to closed position and thereby completes a circuit to energize the brake control solenoid 60(45) for stopping the spindle. At this time, the tape control unit also momentarily opens its associated switch 97(29) to interrupt the holding circuit for the relay 96(26). Deenergizing of relay 96 renders the remainder of the circuits inactive and the machine tool is ready for the next tool change. Deenergization of relay 96(26) also opens its contact 96–4(37) which deenergizes relay 100 and thereby opens its contact 100–6 (between lines 22 and 23) to terminate operation of the tape control unit 10. Prior to the actuation of the switch 97, which effectively terminates the machine tool operation, the next tool is called for and its code stored in the tool select register. If the right tool has been placed in cradle 15, the coincidence circuit is energized, light 87 is lighted and relay 96 is activated due to the fact that switch 97 was only momentarily opened. The machine tool is now ready for the tool change by the machine operator and the start of the next machining operations.

EMERGENCY STOP

If the machine operator desires to stop spindle rotation, in case of emergency or the like, yet retain all of the dynamic control conditions as they are, so that restarting will continue the cycle of operations, he actuates stop switch 105(31) to energize relay 104(31) which will close its contacts 104–1(33) and 104–3(46), as well as open its normally closed contact 104–2(39). Opening of contact 104–2(39) interrupts the holding circuit for relay 100(37), which is thereby deenergized, and its contact 100–2(33) is closed. Since contact 100–2(33) is now closed, the closing of contact 104–1(33) provides a holding circuit for relay 104. Because contact 100–5(46) is closed by deenergizing relay 100(37), closure of contact 104–3(46) will energize brake control solenoid 60(45) to actuate the brake 51 and stop the rotation of the spindle. It is further noted that contact 100–6 (between lines 22 and 23) is opened by deenergizing relay 100 and further functioning of the tape control circuit is stopped. When it is desired to restart the machine tool operations, the tool change complete switch CS(37) is depressed which energizes relay 100, placing its contacts back to their operating position, and in so doing, opening contact 100–2 to interrupt the holding circuit for emergency stop relay 104. The machine then proceeds with the machining operation that was temporarily interrupted.

MANUAL CONTROL

If it is desired to manually control the tool select register, push button switches 106, 107, 108, 109 and 110 are actuated in the desired combination. They are each connected to a common conductor and individually connected to one of the code identifying relays 80 to 84. Thus a binary number representing a particular tool code can be manually stored in the tool select register by depressing the proper switches. To energize the common conductor 111 and otherwise set the circuit for manual control, push button switch 76(10) is depressed to interrupt the holding circuit to relay 75(8) and deenergize it to place its contacts in normal position. Contact 75–3(15) will then open to disconnect power from the tape control unit 10, and contact 75-2(11) will open to disconnect power from the tape controlled tool select switches 79(13, 15, 17, 19 and 21) and thereby isolate the tape control from the circuit. Contact 75-4(25) will be closed and condition a circuit that can be energized by depressing a push button 78(25) which, when depressed, will energize a relay 112(25) to close its contact 112-1(23) and thereby form a holding circuit for maintaining relay 112 energized. Energization of relay 112 to close its contact 112-2(12) to energize the common conductor 111 for the manual tool select switches and to open contact 112-3(8) to interrupt the circuit for relay 75 and preclude its actuation during manual control for preventing the tape control unit 10 from operating. During manual operation, a tool code stored in the latching relays 80 to 84 can be removed by operating the unlatching relays 88 to 92 by depressing a push button switch 113(28) which energizes conductor 93 that is common to the unlatching relays 88 to 92. The storing of a binary number in the tool select register by use of the manual switches 106 to 110 will be apparent as they are used in the same manner that the switches 79 are set by a tape command, the only difference being that they are set manually rather than by signals from the tape. After the manual operation is completed and to condition the circuit for automatic tape control, a push button 114(23) is depressed to break the holding circuit for relay 112.

TAPE READER

Although other tape and tape control readers can be used, the tape reader 11, shown in FIG. 5, is particularly suitable for use with the tool verifying circuits of the present invention. The tape 12 is advanced step-by-step by a sprocket 115 that has teeth which enter a central continuous row of punched holes 124 in the tape, shown in FIGS. 6 and 7. The tape is advanced in increments over a row of sensing pins 116 that cooperate with holes in the tape to produce the control signals. The sprocket wheel is driven by a belt 119, pulley 117, and a motor 118. The belt 119 also drives a cam 120 which actuates a rock lever 121 about its pivot 123 against the urge of a spring 122 to retract the sensing pins 116 away from the tape.

Portions of punched tape 12 are depicted in FIGS. 6 and 7. The tape illustrated is provided with six channels plus a central row of sprocket holes 124 that cooperate with the sprocket 115 to effect the incremental advancement of the tape 12 through the tape reader 11. The tape is arranged in what is known in the art as binary coded decimal fashion wherein a transverse line of holes will represent a binary number and each binary number, in turn, will constitute one digit of a decimal number. Thus, in FIG. 6, the section of tape identified as "Tool Select" indicates that tool number 12 is called for. The first line of the "Tool Select" section has a hole 401 punched in the first channel of the tape to indicate that the first digit of the binary number is "on." No holes have been punched in the other channels of this line. Accordingly, the binary number represented by this line is 0001 which corresponds to the decimal number 1, and the latter constitutes the first digit of a two digit decimal number. The second line of this section of the tape has a hole 402 punched in the second channel only to represent the binary number 0010 which corresponds to the decimal number 2, and the latter constitutes the second digit of the decimal number. Therefore, the tape has been punched in the "Tool Select" section to call for tool number 12. The portion of punched tape 12, shown in FIG. 7, has been punched in the same manner in the "Tool Select" section to call for tool number 18.

The presence or absence of holes in the several channels of each line in the tape are sensed by the row of sensing pins 116. There is a pin 116 for each channel across the tape and each are identical and are urged toward the tape by the rock lever 121 under the resilient urge of the spring 122 so that, if a hole is punched opposite any one or more of the pins, the pins will enter the hole, and if no hole is punched, that particular pin will be stopped by the tape. In this manner, the pins read the binary coding represented by each transverse line of holes and transmit that coding, in the form of electrical signals, to the code converter. The signals from the code converter then enter the storage register. When the signals have been stored, a signal is sent from the storage register and distributed via conductor 131 to the relay 132 that actuates contact 133 for starting the motor 118 to operate an additional step for advancing the tape 12 another increment to read the next binary number. In this movement, the motor 118 rotates the cam 120 to move the rock levers 121 for retracting those pins that have penetrated holes in the tape and to index the tape one step. By the time the tape is indexed, the cam 120 has moved to free the rock levers 121 so that the pins 116 may be urged upwardly under the action of their associated springs 122 to enter the holes punched in the tape where the holes exists. The other pins are blocked by the tape. The position of the pins creates a reading indicating a binary code number and this reading is communicated to a switch mechanism 125 and from there to the code converter 411. The switch mechanism 125 comprises a contact bar 126 secured to each pin and a pair of upper contacts 127 and 128 and a pair of lower contacts 129 and 130 associated with each contact bar. When a pin enters a hole in the tape, the upper pair of contacts 127 and 128 for that pin are bridged by the contact bar 126 and when the pin is prevented from entering the tape, as by the absence of a hole, the contact bar of that pin does not move but remains bridging its pair of lower contacts 129 and 130. In this manner, the reader reads one transverse line of holes after another, the step motor 118 advancing the tape one increment at a time and stopping while the tape is read, with the reading being communicated to the storage register and the storage register starting the motor on the next step after the information on the previous line of the tape has been stored. When the binary members, representing a tool select code, or an axis movement, etc., have been read, the tape includes a "tab" line which signals the storage register to enter the digital information in the proper place in the respective registers of the storage register and distributor and starts the motor 118 to advance the tape so that the reading of the digits of the next binary number can proceed. The registers are arranged in sequence to correspond to the sequence existing in the tape, and in accordance therewith, each binary code is transmitted to the next register in the sequence.

MODIFIED CRADLE CAP

A modified cradle cap 134 is disclosed in FIG. 10 which includes a single cradle 135, with a different code reader or tool verifier 136 and also provides a tool change or transfer arm 137 which is rotatable about a pivot 138. One end of the arm 137 is provided with a tool grip 139 and the opposite end with a grip 140, with each grip having a spring urged tool retainer 141 for retaining a tool 17 within the grip during a transfer movement. FIG. 14 discloses a cross-section of the tool grip 139 of the tool change arm 137 to illustrate the tool retainer 141, which constitutes a ball 403 held in a bore 404 by a reduced diameter end of the bore and urged outwardly by a spring 405. As distinguished from the previously described cradle cap 13, where the machine operator removes the verified tool from cradle 15 and exchanges it for the tool, if any, in the spindle, the modified cap 134 provides the tool transfer arm 137 for accomplishing the exchange automatically. The machine operator extracts the next tool from the tool storage 34, FIG. 1, and places it in the cradle 135 whereupon the manual operation has been completed as the transfer of the tool from the cradle 135 to the spindle 3 is accomplished by operation of the tool transfer arm 137. In the cradle cap 13 of FIG. 1, the operator must manually effect the interchange of tools. The modification illustrated in FIG. 10 gives the operator greater leeway since the tool can be placed in the cradle 135 at any time after an interchange, and if the operator is otherwise occupied, the machine can carry on with the current tool, automatically effect a tool interchange, and then complete a machining operation with the new tool before the presence of the operator is required. If the operator should not be available to place a succeeding tool in the cradle, the operation of the machine will terminate when the machining operation with the preceding tool is completed.

The electrical system of the machine, to be described, actuates a solenoid valve to admit fluid to a fluid motor 142 to pivot the tool verifier 136 about its pivot 143 to project its reading plungers 144 into engagement with the code rings on the tool to read the tool code. The motor 142 is swiveled both to the cap 134 and to the verifier 136. The code, so read, is stored by actuating the proper latching relays 80 to 84 to set the contacts of the coincidence circuit as already noted and the setting of these contacts awaits the time when the tape calls for a tool and transmits its code to the coincidence circuit. The coincidence circuit compares the codes and if they coincide, the tool is verified as the proper tool. When the tape signals for a tool change, it causes actuation of the change arm 137 and operates the fluid motor 142 to withdraw the tool verifier from the tool. The tool change arm 137, under tape initiation and automatic control, rotates clockwise from its idle position, shown in FIG. 11, to the vertical position, shown in FIG. 12, where its tool grip 139 engages the tool in the cradle 135 and its grip 140 engages the tool, if any, in the spindle. The change arm 137 then is extended outwardly parallel to the spindle axis to withdraw the tools from the cradle 135 and spindle 3, as shown in FIG. 12. The arm 137 is then rotated 180° to interchange the positions, align the new tool with the spindle 3, and the used tool with the cradle 135. The tool change arm 137 is then retracted inwardly to insert the tools in the spindle 3 and cradle 135 respectively, as shown in FIG. 13, and then move to its horizontal idle position and the next cycle of the machine is initiated. The machine operator has to return to the machine to remove the used tool from the cradle and place the next new tool therein for subsequent automatic tool change, but if he does not return in time, this will not be detrimental. This is so, because when the tape sends the next tool code to the tool select register, it will impose its code on the coincidence circuit, but the coincidence circuit is still receiving the code of the used tool left in the cradle and coincidence will not be established. Lack of coincidence will prevent the machine from operating, and in effect, cause it to await the return of the operator. The movements of the tool change arm and other phases above mentioned, will be explained in greater detail as the description of the invention proceeds.

The detailed mounting and operating means for the change arm 137 is disclosed in FIG. 15, wherein the change arm is supported by the left end of a shaft 146, the two being secured together in a conventional manner, and the shaft forming the aforesaid pivot 138. The shaft 146 is supported in a sleeve bearing 149 at the change arm end, and at the opposite end in a rotatable drive sleeve 150, the sleeve being journaled in bearings 151. The drive sleeve 150 has internal splines and the shaft has external splines cooperating with those of the sleeve so that when the sleeve is rotated by a worm gear 154 driven by a worm 155 which is connected to be rotated by a fluid motor 156, the shaft 146 and its associated change arm 137 are rotated as required for a tool transfer operation. The aforesaid splines are elongated so that the shaft 146 can be moved axially to move the change arm to withdraw or insert tools in the cradle and spindle. Axial movement is accomplished by a fluid motor 257 having its piston 258 secured to a piston rod 259 adjustably fixed to a shift block 260 that is coupled to the shaft 146. The shift block 260 is coupled to the shaft 146 by a fork 263 engaging an annular groove formed by a pair of collars 261 and 262 secured to the shaft 146 in spaced relationship. In this arrangement, the shaft 146 is coupled for axial movement with the shift block 260 by the fork 263 but the latter does not interfere with the rotation of the shaft 146.

The drive sleeve 150 has cam disks 265 and 266 attached to its left end to engage switches 267 and 268 that control the rotation of the motor 156 for rotating the change arm 137 by activating suitable solenoid valves, as explained hereinafter. Activation of the solenoid valves that control the motor 257, and therefore the axial movement of the shaft 146 and change arm 137, is under control of a pair of limit switches 269 and 270 which are actuated individually by the shift block 260 in either extreme of its axial movement. As already noted, the change arm 137 rotates clockwise, as viewed when facing the front of the machine, from its horizontal rest position to a vertical position where it engages a tool 17 in the cradle 135 and another tool 17 in the spindle 3. The tool change arm 137 then moves outwardly to withdraw the tools, rotates clockwise 180° to transfer the cradle tool to the spindle and the spindle tool to the cradle, moves inwardly to insert the tools and then rotates counterclockwise to its horizontal rest position, being stopped by the stop pin 274, FIG. 10, that is secured to the cap. The rotation of the change arm 137 to its vertical position to grip the tools is stopped by engagement with the tools in the cradle 135 and the spindle 3, or by engagement with a fixed stop 304, but the rotation of the change arm, while it is in its extended position to interchange the tools, is limited by an extendible stop 275 mounted on an elongated rod 276, one end of which is slidable in a fluid motor 277 that is mounted on the shift block 260. That part of the rod 276, that is slidable in the motor 277, is provided with a shoulder at its right end abutting the right end of the cylinder that encompasses it, is held in such abutment by a spring 278. As the change arm moves outwardly for the purpose of withdrawing the tools, the stop 275 moves outwardly since the motor 277 is mounted to move with the shift block 260, the shift block moving both the change arm 137 and the stop 275. To move the stop 275 an additional amount relative to the tool change arm in the path of rotation of the change arm, the rod 276 is provided with a reduced diameter within its cooperating cylinder to form an annular piston surface that is subjected to hydraulic pressure applied simultaneously to the motors 257 and 277 via the conduit 279. The hydraulic pressure in the motor 277 acts upon the annular piston surface to extend the stop 275 outwardly against the pressure of the spring 278 and relative to the tool change arm 137. The spring urged tool retainers 141, FIGS. 7 and 14, prevent the release of a gripped tool during the swinging movements of the change arm. The tools 17 are releasably retained in the cradle 135 by a spring pressed ball 283 that engages an annular groove 284 in the tool.

FLUID SYSTEM FOR MODIFIED CAP

The hydraulic circuit for operating the tool change arm version illustrated in FIG. 10 is shown diagrammatically in FIG. 16, and constitutes an addition to the hydraulic system of FIG. 8. The pressure line 55 and exhaust line 58 from the circuit in FIG. 8 extends into that portion of the circuit that is shown in FIG. 16. Pressure fluid is first conducted to a valve 285 that controls the direction of rotation of the motor 156 that rotates the change arm 137. The valve has three sets of ports, the parallel ports on the left for clockwise rotation, the cross ports on the right for counterclockwise rotation, and the central ports connecting both lines of the motor to exhaust, designating the central neutral position of the valve under the influence of centering springs 286 and 287. The valve is moved against the action of the springs in either direction by solenoids 288 and 289 activated by the electrical control circuit in a manner to be subsequently described.

The main pressure line 55 and main exhaust line 58 are also connected to a solenoid valve 290 that controls the fluid motor 142 for pivoting the tool verifier into and out of tool reading position. The valve 290 has cross ports communicating in the normal position of the valve, as established by a spring 291, to direct pressure to the right side of the motor 142 for pivoting the verifier into reading position. Parallel ports of the valve 290 are rendered active by a solenoid 292 to direct pressure to the left side of the motor 142 for retracting the verifier from its operating position. The main pressure line 55 and main exhaust line 58 are connected to a solenoid valve 293 that controls the motor 257 for the axial movement of the change arm 137 as regulated by the electrical system in a manner to be subsequently described. The valve 293 has three pairs of ports in which the central port conducts fluid in the neutral position of the valve as established by opposed spring pressure and these central ports connect both fluid motors 257 and 277 to exhaust. The parallel ports rendered active by energization of a solenoid 294 direct pressure to the motors 257 and 277 for moving the change arm 137 and stop 275 outwardly. On the other hand, the cross ports direct pressure to the right side of fluid motor 257 to retract the change arm to its inward position and connects the left side of both motors to exhaust wherein the stop 275 is returned under spring pressure, as previously described.

ELECTRICAL SYSTEM FOR MODIFIED CAP

Figure 17:
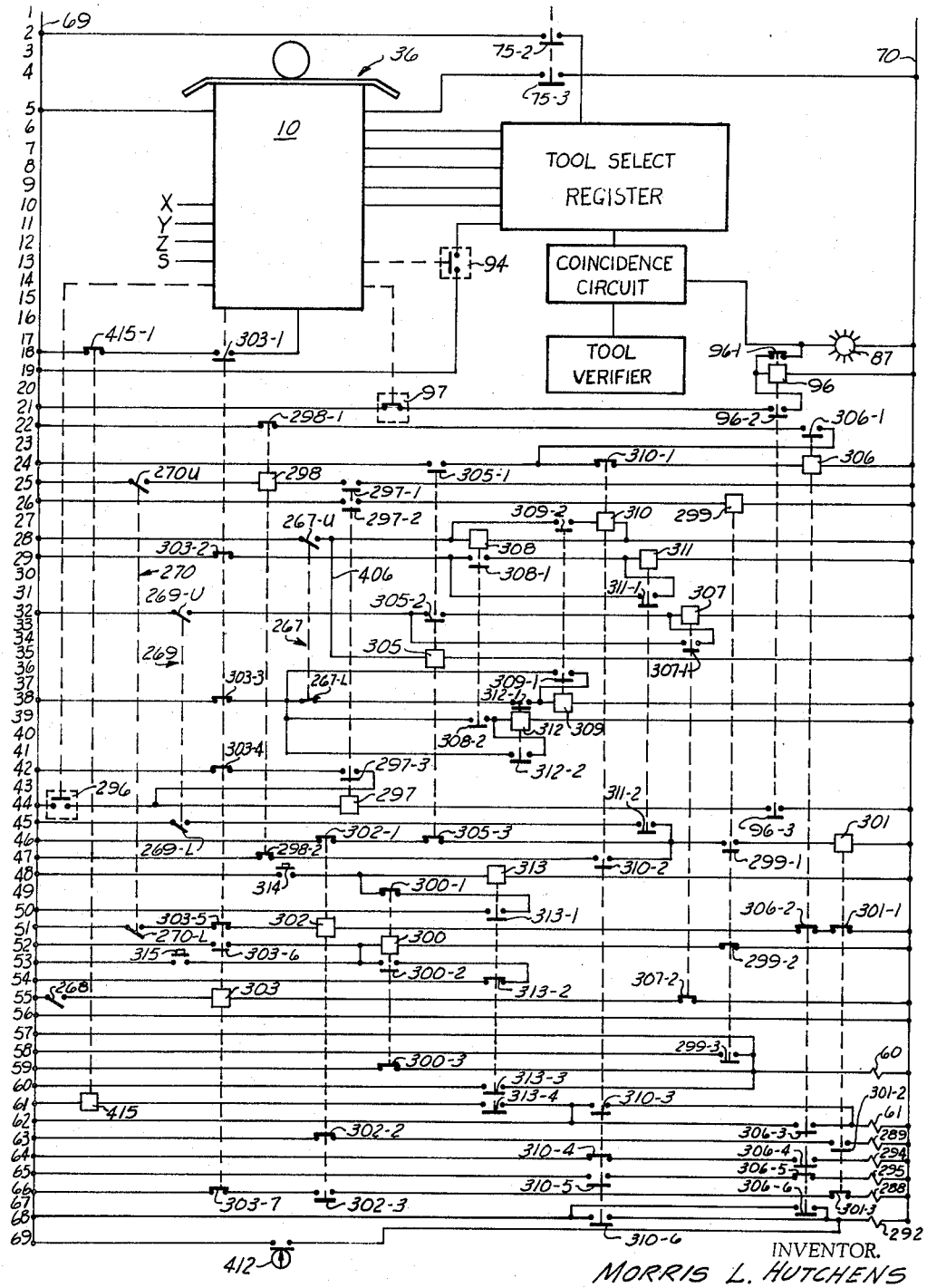
FIG. 17 is a diagrammatic view of the electrical circuit for selecting a tool and operating the tool change member of the modified machine tool shown in FIG. 10.

The electrical system for the version incorporating the tool change arm 137 is disclosed in FIG. 17, which constitutes a modification of the electrical circuit shown in FIG. 9. The circuit of FIG. 9 down through line 28 includes the circuits to start the motor 52 for the hydraulic pump 53, the transformer to supply low voltage control power to vertical power lines 69 and 70 and the electrical circuits to the tape control unit, the tool select register, the tool verifier, and the coincidence circuit that activates the light 87 and energizes the relay 96, which is the main control for the remainder of the circuit of FIG. 9. Since this portion of the electrical circuit of FIG. 9 is repeated in the electric system of FIG. 17, it is shown in abbreviated form in FIG. 17, wherein the details of the electrical circuit begin with the main control relay 96. The vertical power lines 69 and 70 are a continuation of the power lines of FIG. 9. The electrical elements in FIG. 17 are conditioned with the assumption that the tape has called for a tool, that the tool has been verified by the tool verifier, and that coincidence has been established in the coincidence circuit to light the lamp 87, and to energize relay 96.

Relay 96 having been energized, its contact 96–2(21) closes to establish a holding circuit through the tape controlled normally closed switch 97(21), its contact 96–1 opens to isolate the coincidence circuit, and its contact 96–3 closes to condition a circuit for a tool change, thereby indicating that the proper tool is in the cradle and has been verified. Subsequently, when a machining cycle has been completed and the tape calls for the next tool to be placed in the spindle, or at the start of machining operation on a workpiece, the tape produces a signal to close a switch 296(44) to energize a tool change relay 297 and thereby cause it to close its contacts 297–1(25), 297–2(26), and 297–3(42). At this time, a contact 270–U of the switch 270 is closed as the switch is actuated by the tool change arm 137 in its retracted position so that closure of contact 297–1(25) energizes relay 298(25) to open its normally closed contacts 298–1(22) and 298–2(47) without any effect at this time. It will be noted that if a tool is not in the cradle 15, or if an improper tool had been placed therein, relay 96 would not have been energized by the coincidence circuit and its contact 96–3(44) would remain open to preclude the energization of the tool change relay 297.

Tool change relay 297, having been energized, and relay 299 having been energized thereby, a tool change is about to take place but prior thereto, the spindle brake 51 has to be actuated for preventing rotation of the spindle. This takes place by the energization of relay 299. Its contact 299–3(58) closes to complete a circuit for energizing the brake solenoid 60 to actuate the spindle brake 51 and stop the spindle 3. Its normally closed contact 299–2(52) opens to interrupt the circuit to the spindle start relay 300(52) to prevent the transmission of power for rotating the spindle. A parallel circuit to energize the spindle brake solenoid 60(59) is also established by the deenergization of relay 300 and which closes its contact 300–3. The contact 299–1 of energized relay 299 closes a circuit to energize relay 301. Contact 301–1(51) is thereby opened to preclude energization of relay 302 to prevent energization of the solenoid 288 which controls counterclockwise rotation of the tool change arm. This result is obtained because energization of relay 301 opens its contact 301–3(66) which is in the circuit containing the solenoid 288(66). Contact 301–2 is closed to energize solenoid 289 that shifts the solenoid valve 285, FIG. 16, to admit pressure fluid to the motor 156 which rotates the tool change arm clockwise from its horizontal idle position, shown in FIG. 11. A tool change has now started with the change arm rotating to vertical position to grip the cradle held tool 17 and the spindle held tool 17, if any. As the change arm begins to rotate, the cam disk 265, FIGS. 15, 15A and 16, that is mounted on the shaft 146 passes its cam beyond switch 268 to deactuate the switch. Deactuation of switch 268(55), FIG. 17, interrupts the energizing circuit for a relay 303 so that all of its associated contacts are closed except 303–1(18) and 303–6(52). Closure of contact 303–4, together with the now closed contact 297–3 completes a holding circuit for the tool change relay 297(44). Opening of contact 303–1(18) stops the tape advance and isolates the tape control from the tool change circuits. Opening of contact 303–6(52) further interrupts the circuit to the spindle start relay 300. The closed switches of relay 303 condition circuit for subsequent operation.

The tool change arm 137, now rotating clockwise, reaches its vertical, tool gripping position and engages a fixed stop 304, FIG. 10, where it is still under the clockwise urge of motor 156. The next step is to move the tool change arm outwardly, where it will clear fixed stop 304, the outward movement also extracting the tools 17 that are now gripped by the tool change arm 137 from the spindle 3 and cradle 135 to the position illustrated in FIG. 12, where they will clear the cap as the change arm rotates. However, before extracting the tool from the cradle 135, the verifier 136 has to be moved out of engagement with the tool in the cradle and the spindle collet 45 has to be released to free the tools for outward movement. As the tool change arm contacts the fixed stop 304, a cam on the cam wheel 266 actuates switch 267 moving its associated contacts 267–U(28) and 267–L(38) respectively, to closed and open positions. Closure of contact 267–U completes a circuit to energize a relay 308(28) to move its contacts 308–1(29) and 308–2(39) to closed position. Closure of contact 308–2(39) serves to energize a relay 312 causing it to close its contact 312–2(41) and thereby create a holding circuit for maintaining the relay 312 energized. Closure of contact 312–1(38) conditions a circuit for subsequent operation. Since relay 308 was energized, it closes its contact 308–1(29) to complete a circuit which energizes a relay 311 whose contact 311–1(31) creates a holding circuit for maintaining relay 311 energized. In addition, the closing of its normally open contact 311–2(45) conditions another circuit for subsequent operations. Closure of contact 267–U(28) also carries current from power line 69 to a vertical conductor 406 to activate a relay 305(35) causing the relay to close its contacts 305–1(24) and 305–2(32) and open its contact 305–3(46). The opening of contact 305–3(46) interrupts the circuit to relay 301(46) and deenergizes it to open its contact 301–2(63) and deactivate solenoid 289(63) to deenergize motor 156 and stop its clockwise rotational urge on the tool change arm 137. Closure of contact 305–1(24) completes a circuit to energize a relay 306(24) which closes its normally open contacts 306–1, 306–3, 306–4 and 306–6, and opens its contacts 306–2 and 306–5. Closure of contact 306–3(62) completes a circuit for energizing solenoid 61(62) to actuate valve 57 for directing hydraulic pressure into the left end of motor 50 to force rod 47 against the collet actuating shaft 49 to actuate the collet 45 for releasing the tool 17 in the spindle 3. Closure of contact 306–(67) energizes the verifier retracting solenoid 292 that actuates valve 290, in FIG. 16, to direct fluid pressure to motor 142 to actuate the motor for pivoting the verifier 136 rightwardly to the retracted position.

Conditions have now been established for moving the tool change arm 137 outwardly to withdraw the tools 17, in grips 139 and 140, from the cradle 135 and the spindle 3 respectively, and to clear fixed stop 304. To this end, the closed contact 306–4(64) completes a circuit to energize solenoid 294(64) to actuate valve 293, FIG. 16, for directing fluid pressure into the motor 257, through the parallel ports, to extend the tool change arm 137 outwardly. Also moved outwardly as a result of actuation of the valve 293, is the stop 275, which initially moves with the block 260 and is then moved further relative to the block 260 by its own motor 277 receiving pressure fluid from a conduit that branches from the conduit carrying pressure to the motor 257, as previously described. When the tool change arm reaches its outermost position, as seen in FIG. 12, it is caused to again rotate clockwise to transpose the two tools 17 in its grips 139 and 140, wherein the tool formerly in the cradle 135 is aligned with the spindle 3, and the spindle tool is aligned axially with the cradle, as illustrated in FIG. 13. The rotation of the tool change arm 137 is stopped in the proper vertical position by its engagement with the stop 275, which has been extended into the rotary path of travel of the arm 137, as previously described. However, since the tool change arm has moved outwardly, the shift block 260 releases the limit switch 270 to deactuate it, moving its contact bars 270–U(25) and 270–L(51) to open position. The now open contact 270–U(25) interrupts the circuit for energizing relay 298(25) so that relay 298 is deenergized and its contacts 298–1(22) and 298–2(47) are closed. Closure of contact 298–1(22) completes a holding circuit for maintaining relay 306 energized. Closure of contact 298–2 conditions a circuit for subsequent energization.

As the tool change arm is extended to its outermost position, its shift block 260, FIG. 15, actuates limit switch 269, which closes its associated contacts 269–U(32), FIG. 17, and 269–L(45). Closure of contact 269–U completes a circuit to energize a relay 307 which closes its contact 307–1(34) and opens its contact 307–2(55). Closure of contact 307–1(34) creates a holding circuit for relay 307 by by-passing contact 305–2(32). Opening of contact 307–2(55) interrupts the circuit to the relay 303(55) and also causes the switch 268 to have no effect when it is momentarily actuated by the cam 265 when the tool change arm is subsequently rotated. Closure of the contact 269–L(45) completes a circuit for energizing relay 301 as the relay contacts in the circuit are all closed at the present time. The energization of relay 301 closes its contact 301–2 to complete the circuit for energizing the solenoid 289 to direct fluid pressure to the motor 156 to effect the rotation of the change arm 137 in clockwise direction (as above described), to interchange the positions of the tools 17. The rotation of the change arm causes a corresponding rotation of its attached cam wheel 266 to move the cam out of contact with switch 267 for deactivating the switch, opening its contact 267–U(28) and closing contact 267–L(38). Opening of the contact 267–U(28) opens parallel holding circuits but has no effect at this time. Closure of contact 267–L(38) completes a circuit through the now closed contacts 303–3 and 312–1 energizing a relay 309(38), causing the relay to close its contact 309–1(36) to create a holding circuit for relay 309 and closing its contact 309–2(27) to condition a circuit for subsequent energization of a relay 310 when contact 267–U of limit switch 267 is later closed. As the tool change arm continues to rotate, a cam on cam wheel 265 momentarily closes switch 268(55) without effect as switch 307–2(55) is open, as noted above. When the tool change has rotated 180°, to arrive at its reversed vertical position, it engages the extended stop 275 and is held against the stop by the continued force applied by the fluid motor 156. At this point, it is noted that at the initiation of the tool change cycle, the stop 275 is in its inward position, as illustrated in FIG. 11, against the cradle cap 134. When the change arm is extended outwardly, to the position shown in FIG. 12, the stop 275 moves with it, and when the tool change arm 137 reaches its extended limit of movement, the stop 275 is urged against the back face of the arm 137 by the fluid motor 277, in the manner illustrated in FIG. 12. The edges of the change arm 137 are provided with slots 275A to receive the disk-like head of the stop 275. As the change arm rotates clockwise from the position shown in FIG. 12 to transpose the tools, the back face will slide past the stop and release it to enable it to be extended to its limit of movement by the fluid motor 277. This will locate the disk-like head 275 in position to enter the slot 275A located on the reverse edge of the change arm in the manner shown in FIG. 13. Such engagement of the tool change arm 137 with the stop 275 positions the change arm with the tools 17 in alignment with the spindle 3 and cradle 135 and maintains that alignment as the tools are inserted. As previously mentioned, the next movement of the change arm is a counterclockwise rotation, which releases the stop 275.

Just prior to the change arm engaging stop 275, a cam on cam wheel 266 actuates the switch 267 causing it to move its associated contacts 267–U(28) and 267–L(38) to closed and open positions respectively. Opening the contact 267–L(38) has no effect at this time. Closing of the contact 267–U(28) reenergizes the relay 308(28) and due to the previous closure of contact 309–2(27), completes a circuit for energizing relay 310(27), which opens its contacts 310–1(24) and 310–4(64) and 310–6(68). The opening of contact 310–4(64) interrupts the circuit to the solenoid 294 to actuate the valve 293 to its neutral position for exhausting the fluid motor 257 that extended the tool change arm 137 outwardly. Closure of contact 310–2(47) creates a parallel circuit to maintain the tool rotational control relay 301(46) energized to retain solenoid 289 energized for continued clockwise urge on the arm 137. Closure of contact 310–3(61) completes a parallel circuit for maintaining the collet release solenoid 61 energized. The closure of contact 310–6(68) creates a parallel circuit to maintain the solenoid 292 energized so that the verifier 136 remains retracted. The above circuits are established so that deenergization of relay 306(24) will have no effect in the circuit, the relay 306(24) being deenergized by the contact 310–1(24) moving to the open position.

Deenergization of relay 306(24) moves its contact 306–5(65) to closed position to energize solenoid 295(65), since contact 310–5 has just been closed. Solenoid 295 is energized to reverse the flow of fluid pressure in the fluid motor 257 to retract the tool change arm to its inward position for the purpose of inserting the newly selected tool into the spindle 3 and the previously used tool into the cradle 135 for subsequent removal and placement in the storage rack 34. During the retraction movement of the tool change arm 137, the clockwise rotational urge on the change arm is maintained by the motor 156 which keeps the arm in engagement with the movable stop 275, to insure proper alignment for insertion of the tools. The initial retracting movement of the tool change arm 137 causes deactuation of its cooperating limit switch 269 so that the switch opens its contacts 269–U(32) and 269–L(45), the opening of contact 269–L having no effect at this time. Opening of contact 269–U(32) interrupts a circuit to deenergize relay 307(32) causing it to close its contact 307–2 which conditions a circuit for subsequent energization of relay 303 by closure of switch 268 which will reactivate the machine tool.

Upon complete retraction of the tool change arm 137, its shift block 260 actuates limit switch 270, so that the switch moves its contacts 270–U(25) and 270–L(51) to closed position. Closure of contact 270–U(25) reenergizes relay 298(25) opening its contacts 298–1(22) and 298–2(47). When contact 298–2(47) is opened, relay 301 is deenergized so that contact 301–2(63) is opened to stop the clockwise rotational urge on the tool change arm 137 by deactivating solenoid 289 and allowing valve 285, FIG. 16, to return to its central neutral position, which functions to connect motor 156 to exhaust. Closure of contact 301–1(51) and the closure of contact 270–L(51) energizes the relay 302(51) to close its contact 302–3(66) which cooperates with the closure of contact 301–3(66) to complete a circuit for energizing solenoid 288, FIG. 16, to shift the plunger of valve 285 for directing fluid pressure to actuate motor 156 for effecting counterclockwise rotation of the tool change arm 137 back to its horizontal idle position. Opening of contact 302–2(63) further insures deenergization of the clockwise solenoid 289.

As the tool change arm begins to rotate in a counterclockwise direction, a cam on cam wheel 266 moves out of engagement with switch 267 to release it and thereby cause it to open its contact 267–U(28) and close its contact 267–L(38), but the closure of contact 267–L(38) has no affect at this time and the opening of contact 267–U deenergizes relays 305, 308 and 310. Deenergization of relay 305 opens its contact 305–1(24) to break the circuit to relay 306 and maintain it deenergized. Deenergization of relay 310(27) opens contact 310–3(61) to deenergize the collet release solenoid 61 whereupon the collet 45 grips the new tool in the spindle 3. Contact 310–6(68) is opened to deenergize the verifier retract solenoid 292 to allow the verifier 136 to move to tool code reading position for reading the next tool placed in the cradle 135. Contact 310–5(65) being opened, the circuit is interrupted to deenergize the solenoid 295 of valve 293 to shift the valve plunger to its neutral position for connecting motor 257 to exhaust to relieve the retracting force which has moved the tool change arm 137 axially from its extended position to its retracted position. Just prior to the arm being stopped in its rotational movement at its horizontal idle position, the cam on cam wheel 265 actuates switch 268(55) to indicate the completion of the tool change operation. Closure of switch 268 energizes relay 303(55) to close its contact 303–6 and open the remaining contacts of the relay 303.

Closure of contact 303–6(52) energizes relay 300(52) so that its closed contact 300–2(53) completes a holding circuit for relay 300. Energization of relay 300 opens its contact 300–1(49) to interrupt the holding circuit for the manually controlled relay 313, and its now open contact 300–3(59) interrupts the circuit to the solenoid 60 which releases the spindle brake and which allows the spindle to be driven. The energization of relay 303 also opens its contact 303–7(66) to deenergize the counterclockwise solenoid 288 to stop the rotational urge on the retracted tool change arm against the fixed stop 274. The opening of contact 303–2(29) by the energized relay 303 deenergizes relay 311 while opening of contact 303–3(38) deenergizes relays 309(38) and 312(39). The opening of contact 303–4(42) of energized relay 303 deenergizes relay 297(44) which opens contacts 297–1(25) and 297–2(26) to deenergize the relays 298 and 299. The energization of relay 303 also opens its normally closed contact 303–5(51) to deenergize relay 302(51). The contact 303–1(13) is also closed to complete a circuit from power line 69 to the tape control unit 10 to start the feeding and reading of the tape for controlling the next cycle of operation with the new tool. At the start of the tape reading, the tape sends a signal to actuate the switch 94(9), which energizes the unlatching relays 88–92, FIG. 9, of the tool select register to unlatch the latching relays 80–84, as explained hereinabove, in connection with the electrical circuit of FIG. 9, and the tool select register is ready to store the next tool code when called for by the tape. The tape also momentarily opens the switch 97(21) to deenergize relay 96 by interrupting its holding circuit and thereby rendering relay 96 inactive until it is reenergized by the subsequent completion of the coincidence circuit. At this time, all of the relays are deenergized except the relay 303, which, besides its relay deenergizing function, is the tape control relay and relay 300 which releases the spindle brake 51 to allow spindle rotation.

The operator may now manually replace the previously used tool 17, which is located in the cradle 135, by the next tool 17 to be used in the spindle 3. In order to remove the old tool from the cradle 135 and insert a new one therein, it is necessary to retract the verifier 136 for clearing the path of the tool into and out of the cradle 135. The retraction of the verifier 136 may be conveniently effected by the machine operator at his convenience by actuating a switch 412 located on the left side of the machine, as illustrated in FIG. 10, and diagrammatically in line 69 of the electrical circuit diagram of FIG. 17. Actuation of the switch 412 will close its associated contact to complete a circuit for energizing a solenoid 292. Energization of solenoid 292 actuates the plunger of valve 290 for directing hydraulic pressure to the motor 142 for retracting the verifier 136 to provide clearance for the withdrawal and insertion of tools from and into the cradle 135.

In this modification, the only operation performed by the machine operator is to manually remove the tool 17 just used by the machine tool from the cradle 135 and replace it with the next tool from the storage rack 34. The next tool will therefore follow the tool now being used by the machine. It will be noted, that as soon as the next tool is placed in the cradle, the code therein will be immediately read by the verifier and identified in the Tool Select Register and in the coincidence circuit where it will be compared with the signals from the tape that designate the succeeding tool. If the tool is verified by the coincidence circuit, relay 96 is energized and the machine tool is ready to effect an automatic tool change when called for by the tape after the current machining cycle is completed. One of the primary features of the present modification is that the machine operator is not required at the machine during a tool change unless he has placed the wrong tool in the cradle. Even then, the machine will stop and remain idle until the operator places the designated tool in the cradle 135. Furthermore, the machine operator may remove the old tool 17 from the cradle 135 and place the new tool 17 therein at his convenience. If the used tool has not been exchanged when the tape signals for a tool change, the used tool will still be in the cradle and its code will be different from that of the tool called for by tape. Accordingly, coincidence will not be established and relay 96 will remain deenergized. The machine will therefore stop and remain stopped until the machine operator places the designated tool in the cradle 135, which will then be automatically transferred to the spindle 3 by the tool change arm 137. Of course, if there is no tool in the cradle, the machine will still not operate because the tool actuated switch 21(26), FIG. 9, determining the presence of a tool in the cradle will not be actuated to connect the coincidence circuit to the power line 69.

The machine operator may stop rotation of the spindle 3 at any time by means of a manually operated switch 341(48) which, if actuated by the machine operator, will complete a circuit to energize relay 313(48) and thereby close contacts 313-1(50), 313-3(60) and 313-4(61), and open contact 313-2(54). Closure of contact 313-1 creates a holding circuit for maintaining relay 313 energized. The opening of contact 313-2 interrupts the holding circuit for spindle rotation relay 300, while closure of contact 313-3 completes a circuit for energizing the spindle brake solenoid 60 to actuate valve 56 for directing fluid pressure to apply the spindle brake 51. At the same time, the now closed contact 313-4 will energize a relay 415 to open its normally closed contact 415-1(13) to interrupt the tape feed during the manual stopping of the spindle. When it is desired to start rotation again, the manual switch 315(53) can be actuated to reenergize relay 300(52) whose contact 300-1(49) will open to deenergize the spindle stop relay 313(48).

MODIFIED VERIFIER

Figure 18:
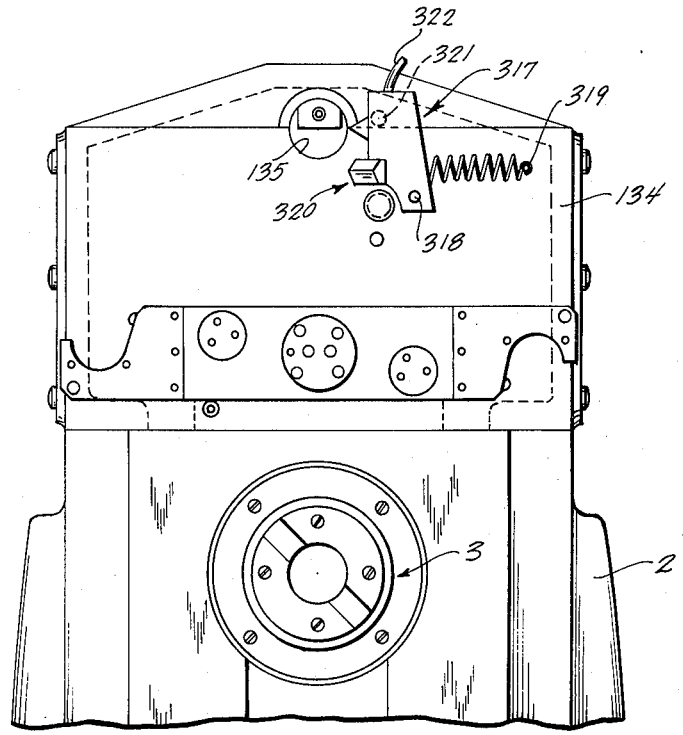
FIG. 18 is a fragmentary view in front elevation illustrating a cam actuated tool verifier mounted in the front of the machine.
Figure 19:
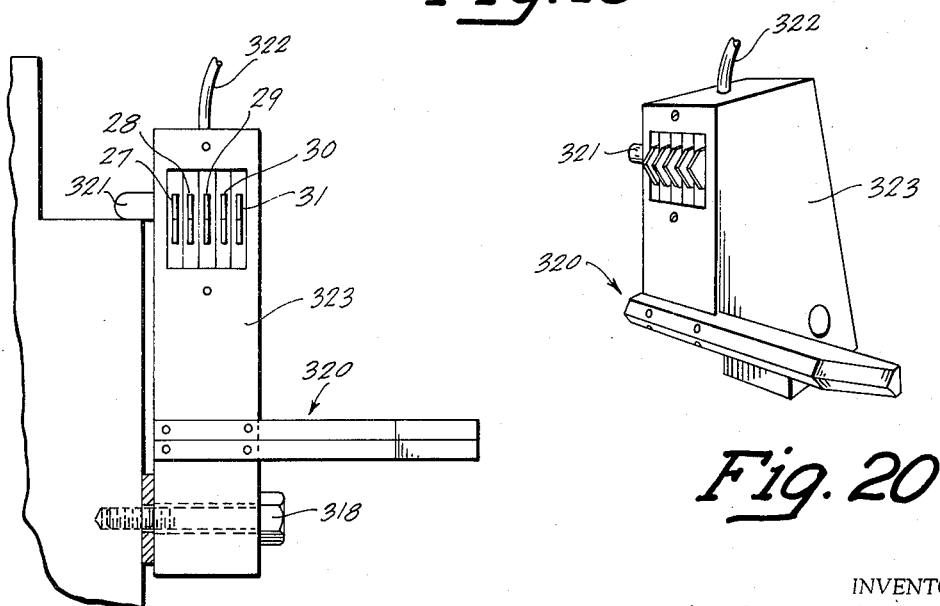
FIG. 19 is a side elevational view of the cam actuated tool verifier shown in FIG. 18.
Figure 20:
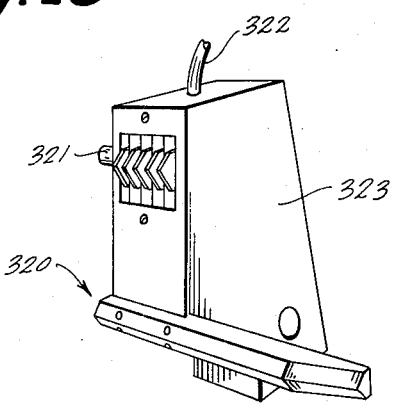
FIG. 20 is a perspective view of the cam actuated tool verifier shown in FIG. 18.

A modified verifier 317 is disclosed in FIGS. 18, 19 and 20, and this verifier distinguishes from the verifier 136, disclosed in FIG. 10, in that it is mechanically operated and controlled by the tool change arm 137, rather than being fluid operated and controlled by the electrical circuit, as is the verifier 136. The verifier 317 is mounted for pivotal movement about a pin 318 and is urged in a counterclockwise direction toward tool code reading position by a spring 319. The verifier 317 is retracted against the force of the spring 319 by a cam 320, the limits of movement being determined by a stop rod 321 engaging the top front surface of the cap 134, as illustrated in FIGS. 18 and 19. In FIGS. 18 and 19, the stop rod is shown in its leftward position, and as the verifier is retracted, the stop rod moves with it in an arcuate path and back into engagement with the top surface of the cap 134 in its rightward position. The verifier has the code reading fingers or plungers 27 to 31, FIG. 19, as explained in connection with the verifier of FIG. 4, with the readings being conveyed to the electrical controls by a cable 322, and this part of the verifier is the same as the verifier 136, shown in FIG. 10. The verifier 317 is retracted automatically by the movement of the tool change arm 137 cooperating with the cam 320. As illustrated in FIGS. 19 and 20, the cam 320 comprises an elongated bar secured at one end to the verifier housing 323, with the other end projecting outwardly therefrom. The front face of the bar has an inclined section at the extended end, with the sides of the entire cam 320 being beveled to form an edge of limited engagement. As noted previously and in connection with FIG. 4, the tool reader fingers 27 to 31 extend into the code section of the tool 17 so that the tool cannot be extracted longitudinally from the cradle 135 as is necessary with the use of a tool change arm, so that the verifier must be retracted to move the fingers away to clear the path for the withdrawals and insertions of the tool by the tool change arm 137. As the tool change arm 137 rotates from its horizontal idle position to its vertical tool gripping position, the leading edge of the tool change arm will engage the straight section of the cam 320 and swing the verifier about the pin 318, so that as the tool change arm reaches its vertical position, the verifier is fully retracted. As the tool change arm is extended to extract the tool from the cradle 135, the leading edge of the arm moves along the straight section of cam 320 and maintains the verifier retracted until the end of the cam 320 is reached, when the verifier returns under the pressure of the spring 319. The tool change arm 137 moves further than the end of the cam 320 to clear the cam as it rotates clockwise 180° to interchange the positions of the two tools in its grips 139 and 140. As previously described, the change arm then moves inwardly to insert the respective tools in the spindle and the cradle, requiring retraction of the verifier. Therefore, as the arm moves inwardly, it engages the inclined section of cam 320, which is in the path of its travel, whereupon further inward movement of the tool change arm 137 causes it to move along the inclined surface of the cam 320 and into engagement with the straight section to pivot the verifier to retracted position. This arrangement is a simpler and less expensive construction than the fluid motor operating under the control of the electrical circuit.

FIG. 21 is a fragmentary view illustrating another modification which includes an apparatus for automatically feeding tools 17 in position to be engaged by the tool change arm 137 and transferred by the arm to the spindle 3 for the performance of a machining operation. The tools are selected and placed in the feeding apparatus in the specified sequence by the machine operator and the apparatus will then function to individually place such tools in that sequence in the spindle 3.

The feeding apparatus of this modification comprises a chute generally identified by the reference numeral 425 and which is mounted on top of the column 2 above the tool change arm 137. The chute 425 includes a bottom plate 426 and a top plate 427 with the latter having an opening 428 at its left end for inserting the tools 17 that are to be used in the spindle 3. In addition, the plate 427 has another opening 429 at its right end through which the used tools may be withdrawn. The top plate 427 and the bottom plate 426 are joined at the rear of the chute by a back plate 430 but the front of the chute is open, as clearly illustrated in FIG. 22, to provide an elongated opening along the entire length of the chute 425.

It is contemplated that the operator will place a number of tools 17 into the chute 425 to complete the several cycles of machining operations on a particular workpiece. The forward portion of the tools 17 extend outwardly of the chute through the elongated front opening and are prevented from being displaced as they advance along the chute by an annular groove 431 of V-shaped cross section formed about each of the tools for engagement with a V-shaped track 432 provided at the forward portion of the bottom plate 426. The chute 425 is mounted on the column 2 inclined from the horizontal with its opening 428 raised appreciably above the opening 429 so that the tools 17 will roll by gravity from the opening 428 to the lower opening 429 with their annular grooves 431 in engagement with the V-track 432 for guiding the tools in their paths of travel.

However, the rolling movement of the tools 17 along the chute 425 is interrupted at a tool ready station 433 and a tool change station 435. The tools 17 are stopped in their paths of travel at the tool ready station by a rod 438 that extends through suitable openings formed in the top plate 427 and the bottom plate 426 to stop a tool 17 at the tool ready station 433 and also stop the advancement of the tool 17 above the tool in the tool ready station 433. The rod 438 is provided at its upper end with a piston 439 disposed within a cylinder 440 for reciprocating the rod 438 into and out of the paths of travel of the tools 17. Thus, the rod 438 is shown in its lowermost position where it prevents the advancement of the tool in the tool ready station 433. However, hydraulic pressure may be admitted into the cylinder 440 through a conduit 441 to actuate the piston 439 upwardly for withdrawing the rod 438 from the path of travel of the tools. As the rod 438 is retracted from the position shown in FIG. 21 by operation of the piston 439, it releases a tool 17 for advancement to the tool change station 435. A rod 445 cooperates with the rod 438 to prevent the advancement of the tools above the tool ready station 433 when the tool in the ready station is being released for advancement to the tool change station 435. To this end, a link 446 is supported by the column 2 for pivotal movement about a pin 447 and the rod 438 is pivotably coupled to one end of the link 446 while the rod 445 is likewise pivotably coupled to the opposite end of the link 446 on the other side of the pivot pin 447. As a result, when the rod 438 is retracted upwardly to release the tool in the ready station 433, the link 446 is pivoted with the axial movement of the rod 438 to actuate the rod 455 in an axial downward movement into the path of travel of the tools 17 for retaining the tools above the ready station 433.

The tool change station 435 is defined by a pair of spaced rods 450 and 451 with one rod being located on each side of a tool 17 located in the tool change station but being retractible therefrom so that the rod 450 may be retracted to release a tool from the tool change station 435 for rolling movement by gravity along the chute 425 towards the opening 429. In like manner, the rod 451 is retractible to admit a new tool into the tool change station 435. The reciprocating movement of the rod 450 for retracting it and advancing it is effected by a piston 452 secured to the top end of the rod 450 and disposed within a cylinder 453. Hydraulic pressure is admitted into the cylinder 453 by a conduit 454 for actuating the piston 452 upwardly to withdraw the rod 450 from the chute 425. The rod 450 is advanced into operating position by a spring 455 disposed within a cylindrical opening 456 with one end bearing against the top of the cylinder and the other end of the spring 455 bearing against a collar 457 that is slidably disposed within the cylinder 456 and is attached for movement with the rod 450. The spring 455 continuously urges the rod 450 to its advanced position in the chute 425 and the rod 450 is retracted by the hydraulic pressure acting against the piston 452 to overcome the pressure of the spring 455.

In like manner, the rod 451 is retracted from the chute 425 by hydraulic pressure admitted into a cylinder 462 from a conduit 463 to act against a piston 464 that is secured to the top end of the rod 451. The upward movement of the piston 464 to retract the rod 451 operates against the force exerted by a spring 465 that is disposed within a cylindrical opening 466 to continuously urge the rod 451 to its advanced position, shown in FIG. 21. To this end, the spring 465 has one end bearing against the upper end of the cylinder 466 and its opposite end bearing against a collar 467 that is attached for movement with the rod 451 and is slidably contained within the cylinder 466.

The tool verifier 136 is disposed between the rods 450 and 451 so that its feelers 144 engage the coding structure on the tool 17 in the tool change station 435. After the tool at the tool change station 435 has been verified as the tool designated by the tape for the next machining operation, the tool change arm 137 is operated in the manner previously described to withdraw the verified tool from between the rods 450 and 451 at the tool change station 435. In order to clear the path of travel for the withdrawal and insertion of a tool 17 in the tool change station 435, the tool reader 136 is retracted in a pivotal movement by the motor 142 in the same manner as described for the modification illustrated in FIG. 10. The V-track 432 is interrupted at the tool change station 435 and replaced by a reciprocable guide 470 that is slidably carried in a recess 471 formed in the column 2 and urged upwardly by a pair of springs 472 to locate a V-edge 473 in the annular groove 431 of the tool 17 at the tool change station 435. However, when the tool change arm 137 withdraws or inserts a tool into the tool change station, the springs 472 yield to permit the guide 470 to move into the recess 471 for admitting passage of the tool into and out of the tool change station 435. When the tool is inserted into the tool change station, the V-edge 473 of the guide 470 is moved into the annular groove 431 in the tool when they are in registration. The V-edge 473 is a continuation of the V-track 432 but yields for movement out of position to permit the passage of a tool.

The flow of hydraulic pressure to the piston and cylinder mechanisms is controlled by a solenoid valve generally identified by the reference numeral 475. The valve 475 is provided with a three position spool 476 that is yieldably urged to its neutral position by a pair of centering springs 477 and 478. The spool 476 may be shifted to the left of the position illustrated in FIG. 21 by energizing a solenoid 479 and may be shifted in a rightward direction by energizing a solenoid 480. The valve 475 is added to the hydraulic circuit illustrated in FIG. 16 and receives its hydraulic pressure from the main pressure line 55. Two exhausts ports 481 and 482 in the valve 475 are likewise connected to the main exhaust line 58 of the hydraulic circuit previously described.

The electrical circuitry illustrated in FIG. 23 is a continuation of the electrical circuit shown diagrammatically in FIG. 17 and is provided for controlling the operation of the tool feeding mechanism shown in FIG. 21. Upon the completion of the operation of the tool transfer member 137 for effecting a tool change, the various elements of the apparatus shown in FIG. 21 will be in the illustrated position. A signal will then originate from the tape to initiate the advancement of a new tool from the tool ready station 433 to the tool change station 435 for subsequent transfer to the spindle 3. The signal from the tape actuates a normally closed switch 485(70) to complete a circuit for energizing the coil of a relay 486(70). Energization of the relay 486 closes its normally open contact 486–1(71) to create a holding circuit for maintaining the relay 486 energized when the switch 485 is open inasmuch as the tape signal produces a momentary closing of the switch 485. In addition, the closing of the contact 486–1(71) completes a circuit for energizing solenoid 479 through a normally closed contact 489(71) of a limit switch 490 also having a normally open contact 491(72). From the normally closed contact 489, the circuit continues through the now closed contact 486–1(71) to the solenoid 479 which is connected to the power line 70.

Energization of the solenoid 479 shifts the valve spool 476 to the left of the position illustrated in FIG. 21 to move a passage 494 in the valve spool 476 into registration with a branch pressure line 495 and the conduit 441 to direct hydraulic pressure for actuating the piston 439 upwardly in the cylinder 440. The hydraulic fluid on the opposite side of the piston 439 is exhausted through a conduit 496 which is prevented from entering a conduit 497 by a check valve 498 but flows into a conduit 499 which is in registration with an angular passage 501 in the spool 476. The opposite end of the passage 501 is in communication with the exhaust port 481 to carry away the exhaust fluid from the cylinder 440.

The actuation of the piston 439 moves the rod 438 upwardly to release the tool 17 in the ready station 433 for advancement into abutment with the rod 451 which prevents the tool from entering the tool change station 435. At the same time, the upward movement of the rod 438 causes a like downward movement of the rod 445 to prevent the succeeding tool from advancing to the tool ready station 433.

The pressure in the conduit 441 also flows into the branch line 454 for actuating the piston 452 for retracting the rod 450 to release the tool 17 in the tool change station 435 for a rolling movement by gravity toward the opening 429. As the tool 17 rolls from the tool change station 435 down the chute 425, it engages a limit switch 490 to actuate the latter momentarily. Actuation of the limit switch 490 momentarily opens its contact 489 to interrupt the circuit to the solenoid 479 as well as the holding circuit for the relay 486 so that both the relay 486(70) and the solenoid 479(71) are deenergized. However, actuation of the limit switch 490 also momentarily closes its contact 491(72) to complete a circuit to a relay 512(72) to cause the relay to close its normally open contacts 512–1(73) and 512–2(74). The closure of the contact 512–1 establishes a holding circuit through the relay 512(72) and a normally closed contact 505-3(72) for maintaining the relay 512 energized.

Energization of the relay 512 also closes its contact 512-2 to complete a circuit to a time delay relay 505(74) which will not be actuated immediately upon energization but will delay actuation for a moment to retain both solenoids 479 and 480 deenergized for a short period of time to permit the valve spool 476 to be shifted to its neutral position, as illustrated in FIG. 21, by its centering springs 477 and 478 to permit the cylinder 453 to be exhausted through the conduit 454 and the conduit 441 and an angular passage 515 in the spool 476 connected to the exhaust port 481. This permits the spring 455 to advance the rod 450 into the path of travel of the tool 17 in the chute 425, as shown in FIG. 21, to retain a tool 17 in the tool change station 435.

After such momentary pause, the relay 505(74) becomes actuated to open its normally closed contact 505-3(72) for interrupting the circuit containing the solenoid 512 to deenergize the latter and return its normally open contacts 512-1(73) and 512-2(74) to their open positions. Although the contact 512-2(74) is open, the relay 505 remains energized through a holding circuit that is completed through a limit switch 510(75) and the now closed contact 505-1(75) through a conductor 506 and the relay 505 which is connected to the power line 70. The energization of the relay 505 also closes its normally open contact 505-2(76) to complete a circuit for energizing the solenoid 480.

Energization of the solenoid 480 shifts the valve spool 476 to the right of the position shown in FIG. 21 to place the spool passage 494 in communication with a branch pressure line 511 and the conduit 497. This carries the hydraulic pressure through the conduit 497, the check valve 498 and the conduit 496 to the cylinder 440 for forcing the piston 439 downwardly to advance the rod 438 into the chute 425 for retaining a tool 17 in the tool ready station 433. At the same time, the advancing movement of the rod 438 retracts the rod 445 to admit the succeeding tool into the tool ready station and into abutment with the rod 438. The exhaust fluid from the cylinder 440 flows into the conductor 441 and through an angular passage 516, which is in communication with the exhaust port 481, for draining the cylinder.

The pressure in the conduit 497 also flows into a branch line 463 to the bottom of the cylinder 462 for forcing the piston 464 upwardly to retract the rod 451 for admitting the tool 17 which abutted it into the tool change station 435 into abutment with the rod 450. As the tool enters the tool change station 435, it actuates a normally closed switch 510(75), illustrated in FIGS. 22 and 23. The actuation of the switch 510 opens its normally closed contact to interrupt the holding circuit to the relay 505(74) for deenergizing the relay and causing it to open its contacts 505-1(75) and 505-2(76). The opening of the contact 505-2(76) deenergizes the relay 480 of the valve 475 to permit the spool 476 to return to its neutral position under the influence of its centering springs 477 and 478. This connects the bottom of the cylinder 462 to the exhaust port 482 through the conduit 463, the conduit 497 and the passage 501 to enable the spring 465 to advance the rod 451 downwardly into the position illustration in FIG. 21. This completes the transfer of the used tool from the tool change station 435 toward the opening 429 and a new tool from the tool ready station 433 into the tool change station 435, and all elements of the apparatus are then in the position illustrated in FIG. 21 in condition to effect another transfer in response to a signal from the tape actuating the tape controlled switch 485(70).

One of the underlying features of the invention that runs through the several modifications is the manual selection of tools by the machine operator and the verification of the tools so selected to preclude the further operation of the machine if a wrong tool has been selected. This is a safety measure to prevent injury to the workpiece or to the machine. The variations effectively determine the attentive aspects of the operator. It should be remembered that if a tool has not been located for verification, the switch 22 will remain open and disconnect the coincidence circuit from the power line 69.

Considering the efficient operation of the machine and the attentiveness of the operator, the FIG. 1 modification requires the operator to be present at the tool change cycle to pick the tool 17 from the cradle 15 and manually place it in the spindle. On the other hand, in the modifications of FIGS. 10 and 21, this function is not performed by the operator as the machine accomplishes the transfer to the spindle. The presence of the operator is therefore not required for effecting the tool change. In the version shown in FIG. 10 the operator is required to place a new tool in the cradle 135 any time between tool changes, while in FIG. 21 all of the tools for performing several cycles of operation can be selected and sequentially placed in the chute 425 at one time and they will be successively transferred to the tool change station at the proper time.

From the foregoing detailed description of the illustrative embodiment set forth herein to exemplify the present invention, it will be apparent that there has been provided an improved automatic machine tool operable in accordance with a predetermined program and incorporating a tool verifier that verifies the tool placed in the machine by the operator to insure that it corresponds with the tool designated in the program and provides for terminating the operation of the machine if such correspondence does not exist to avoid damage to the machine tool as well as the workpiece being operated on.

The above illustrative construction and embodiments of the invention have been described in considerable detail for the purpose of disclosing a practical operative structure for informative and illustrative purposes but it is understood that the features of the invention can be incorporated in other structural forms without departing from the spirit and scope of the invention as is defined in the following claims.

The principles of this invention having now been fully explained in connection with the foregoing description, I hereby claim as my invention:

1. In a machine tool having a work station for performing work operations requiring different tools with each tool being selected for placement in the work station;
    means comparing the tool selected with the tool designated for the machining cycle to be performed in the machine; and,
    means responsive to the existence of coincidence between the selected tool and the tool required to condition the machine tool for operation, thereby checking the selection of tools.

2. In a machine tool;
    means for checking the selection of tools placed therein comprising;
    means registering the identity of a tool required by the machine tool;
    a tool verifier for indicating the identity of a tool selected and presented thereto; and,
    means comparing the registered identity of the required tool and the identity of the tool selected from the tool verifier and operative if the two identifications coincide to condition the machine for performing a work operation with the selected tool.

3. In a programmed machine tool;
    a program control operating the machine through a series of machining cycles using a succession of tools, one for each cycle, the program control issuing commands as to the identity of the tool to be used by the machine for each cycle;
    means identifying the tool that has been selected for each machining cycle; and,
    coincidence means comparing the identity of the selected tool and that called for by the program control for precluding operation of the machine with the selected tool in the event that the two tool identifications do not coincide.

4. In a machine tool adapted to operate a tool in a work operation;
- a tool cradle adapted to support a selected coded tool;
- a tool verifier associated with said cradle to engage and read the code of a tool placed in said cradle;
- means designating the code identifying tool required by said machine for a work operation; and
- coincidence means comparing the code of the selected tool with the code of the tool required and precluding the operation of said machine with the selected tool if coincidence does not exist.

5. A machine tool according to claim 4, including,
- a spindle; and,
- tool change means operable in response to a signal from said coincidence means, if coincidence exists, to exchange the tools between said cradle and said spindle.

6. In a machine tool;
- a tape control having means for regulating the operation of the elements of the machine tool for carrying out machining operations;
- means issuing signals identifying a tool desired for the next machining operation;
- a tool select register receiving and storing the identification of the tool desired;
- means issuing signals identifying the selected tool; and,
- coincidence means rendered operative by the signals of the desired tool and the signals of the selected tool to indicate when the two signals are identical.

7. In a machine tool;
- a frame;
- a tool support fixedly secured to said frame for individually supporting a selected tool;
- a tool driver operably mounted in said frame for receiving and operating tools in a machining operation;
- tool change means for interchanging tools between said tool support and said tool driver;
- means identifying the tool supported in said tool support;
- means identifying the tool required for a specific work operation by said machine; and,
- means comparing the identification of the required tool and the identification of the tool placed in said cradle, and if coincidence exists, conditioning said tool change means for operation.

8. In a machine tool;
- an inclined trackway having a loading end, an unloading end, and an intermediary tool change location, said trackway being adapted to receive and store tools sequentially placed therein;
- means to stop the placed tools and individually release said tools for movement along said trackway to said tool change location as required by the machining program of said machine;
- a spindle;
- transfer means for transferring the tool at said tool change location to said spindle and returning the used tool in said spindle to said tool change location;
- means to release the used tool when placed in said tool change location for movement along said trackway to the unloading end of said trackway;
- signal means for identifying the succeeding tool to be placed in said spindle for the performance of a machining operation;
- a tool verifier associated with said trackway for identifying each tool in the tool change location; and,
- coincidence means for comparing the tool identifications from said signal means and from said verifier and conditioning said transfer means for a tool interchange operation if the two tool identifications coincide.

References Cited by the Examiner
UNITED STATES PATENTS

| | | | |
|---|---|---|---|
| 3,052,011 | 9/1962 | Brainard | 29—568 |
| 3,133,349 | 5/1964 | Riedel | 29—568 |

RICHARD H. EANES, JR., *Primary Examiner.*

Disclaimer 3,249,997.—*Morris L. Hutchens*, Brookfield, Wis. PROGRAM TOOL VERIFIER. Patent dated May 10, 1966. Disclaimer filed June 26, 1972, by the assignee, *Kearney & Trecker Corporation*.

Hereby enters this disclaimer to all claims of said patent.

[*Official Gazette February 19, 1974.*]